United States Patent
Takahashi et al.

(10) Patent No.: US 10,292,065 B2
(45) Date of Patent: *May 14, 2019

(54) TERMINAL DEVICE, BASE STATION DEVICE, INTEGRATED CIRCUIT, AND RADIO COMMUNICATION METHOD

(71) Applicant: Sharp Kabushiki Kaisha, Sakai, Osaka (JP)

(72) Inventors: Hiroki Takahashi, Sakai (JP); Shoichi Suzuki, Sakai (JP); Tatsushi Aiba, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,244

(22) Filed: Feb. 16, 2018

(65) Prior Publication Data

US 2018/0176813 A1 Jun. 21, 2018

Related U.S. Application Data

(63) Continuation of application No. 14/758,276, filed as application No. PCT/JP2014/066271 on Jun. 19, 2014, now Pat. No. 9,924,396.

(30) Foreign Application Priority Data

Jun. 19, 2013 (JP) .................................. 2013-128437

(51) Int. Cl.
*H04B 7/06* (2006.01)
*H04L 1/18* (2006.01)
(Continued)

(52) U.S. Cl.
CPC .......... *H04W 24/10* (2013.01); *H04B 7/0626* (2013.01); *H04L 1/0001* (2013.01);
(Continued)

(58) Field of Classification Search
CPC .. H04W 24/02–24/10; H04W 72/12–72/1294; H04L 1/1812;
(Continued)

(56) References Cited

U.S. PATENT DOCUMENTS 9,924,396 B2 * 3/2018 Takahashi ............. H04W 24/10
 370/252
2013/0286904 A1 * 10/2013 Xu .......................... H04L 5/001
 370/280

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213 V11.2.0, Feb. 2013, pp. 62-77.*

(Continued)

*Primary Examiner* — Timothy J Weidner
(74) *Attorney, Agent, or Firm* — Keating & Bennett, LLP

(57) ABSTRACT

A terminal apparatus which performs periodic channel state information reporting to a base station apparatus, the terminal apparatus including a reception unit that receives first information, second information, and index information indicating a value for reporting periodicity of the channel state information, from the base station apparatus, and a transmission control unit that determines the value for reporting periodicity of the channel state information on the basis of the index information, in which the applicable value is based on a certain UL-DL configuration, in which, in a case where the second information is not configured, the certain UL-DL configuration is a UL-DL configuration indicated by the first information, and in which, in a case where the second information is configured, the certain (Continued)

UL-DL configuration is a UL-DL configuration indicated by the second information. Consequently, in a radio communication system which employs dynamic TDD, interference with a downlink signal is avoided, and an uplink control signal is transmitted.

6 Claims, 25 Drawing Sheets

(51) Int. Cl.
*H04L 5/14* (2006.01)
*H04W 24/10* (2009.01)
*H04W 72/12* (2009.01)
*H04L 5/00* (2006.01)
*H04L 1/00* (2006.01)

(52) U.S. Cl.
CPC .......... *H04L 1/0026* (2013.01); *H04L 1/0027* (2013.01); *H04L 1/1812* (2013.01); *H04L 5/0055* (2013.01); *H04L 5/0057* (2013.01); *H04L 5/0073* (2013.01); *H04L 5/1469* (2013.01); *H04W 72/1268* (2013.01)

(58) Field of Classification Search
CPC ... H04L 5/0057; H04L 5/1469; H04B 7/0626; H04B 7/0632
See application file for complete search history.

(56) References Cited

OTHER PUBLICATIONS

Takahashi et al., "Terminal Device, Base Station Device, Integrated Circuit, and Radio Communication Method", U.S. Appl. No. 14/758,276, filed Jun. 29, 2015.

* cited by examiner

FIG. 7

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| CONDITION | FIRST UPLINK REFERENCE UL-DL CONFIGURATION | FIRST DOWNLINK REFERENCE UL-DL CONFIGURATION |
|---|---|---|
| (a) | D | D |
| (b) | U | U OR D |
| (c) | S | S OR D |

FIG. 14

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U OR D |
| (g) | S | S | S |
| (h) | S | D | S OR D |

FIG. 15

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 16

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 17

| UPLINK-DOWNLINK CONFIGURATION | SUBFRAME NUMBERS | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 20

| $I_{CQI/PMI}$ | VALUE OF $N_{pd}$ | VALUE OF $N_{OFFSET,CQI}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | RESERVED | |

FIG. 22

| FIRST DOWNLINK REFERENCE UL-DL CONFIGURATION | SUBFRAME NUMBER | | | | | | | | | | SUPPORTED PERIODIC CSI TRANSMISSION PERIODICITY (ms) |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 1, 5, 10, 20, 40, 80, 160 |
| 1 | D | S | U | U | D | D | S | U | U | D | 1, 5, 10, 20, 40, 80, 160 |
| 2 | D | S | U | D | D | D | S | U | D | D | 5, 10, 20, 40, 80, 160 |
| 3 | D | S | U | U | U | D | D | D | D | D | 1, 10, 20, 40, 80, 160 |
| 4 | D | S | U | U | D | D | D | D | D | D | 1, 10, 20, 40, 80, 160 |
| 5 | D | S | U | D | D | D | D | D | D | D | 10, 20, 40, 80, 160 |
| 6 | D | S | U | U | U | D | S | U | U | D | 1, 5, 10, 20, 40, 80, 160 |

FIG. 26

| SR CONFIGURATION INDEX $I_{SR}$ | SR PERIODICITY (ms) $SR_{PERIODICITY}$ | SR SUBFRAME OFFSET $N_{OFFSET,SR}$ |
|---|---|---|
| 0 – 4 | 5 | $I_{SR}$ |
| 5 – 14 | 10 | $I_{SR}$ – 5 |
| 15 – 34 | 20 | $I_{SR}$ – 15 |
| 35 – 74 | 40 | $I_{SR}$ – 35 |
| 75 – 154 | 80 | $I_{SR}$ – 75 |
| 155 – 156 | 2 | $I_{SR}$ – 155 |
| 157 | 1 | $I_{SR}$ – 157 |

FIG. 27

| FIRST DOWNLINK REFERENCE UL-DL CONFIGURATION | SUBFRAME NUMBER | | | | | | | | | | SUPPORTED PERIODICITY (ms) OF SUBFRAME IN WHICH SR CAN BE TRANSMITTED |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 1, 2, 5, 10, 20, 40, 80 |
| 1 | D | S | U | U | D | D | S | U | U | D | 1, 5, 10, 20, 40, 80 |
| 2 | D | S | U | D | D | D | S | U | D | D | 5, 10, 20, 40, 80 |
| 3 | D | S | U | U | U | D | D | D | D | D | 1, 2, 10, 20, 40, 80 |
| 4 | D | S | U | U | D | D | D | D | D | D | 1, 10, 20, 40, 80 |
| 5 | D | S | U | D | D | D | D | D | D | D | 10, 20, 40, 80 |
| 6 | D | S | U | U | U | D | S | U | U | D | 1, 2, 5, 10, 20, 40, 80 |

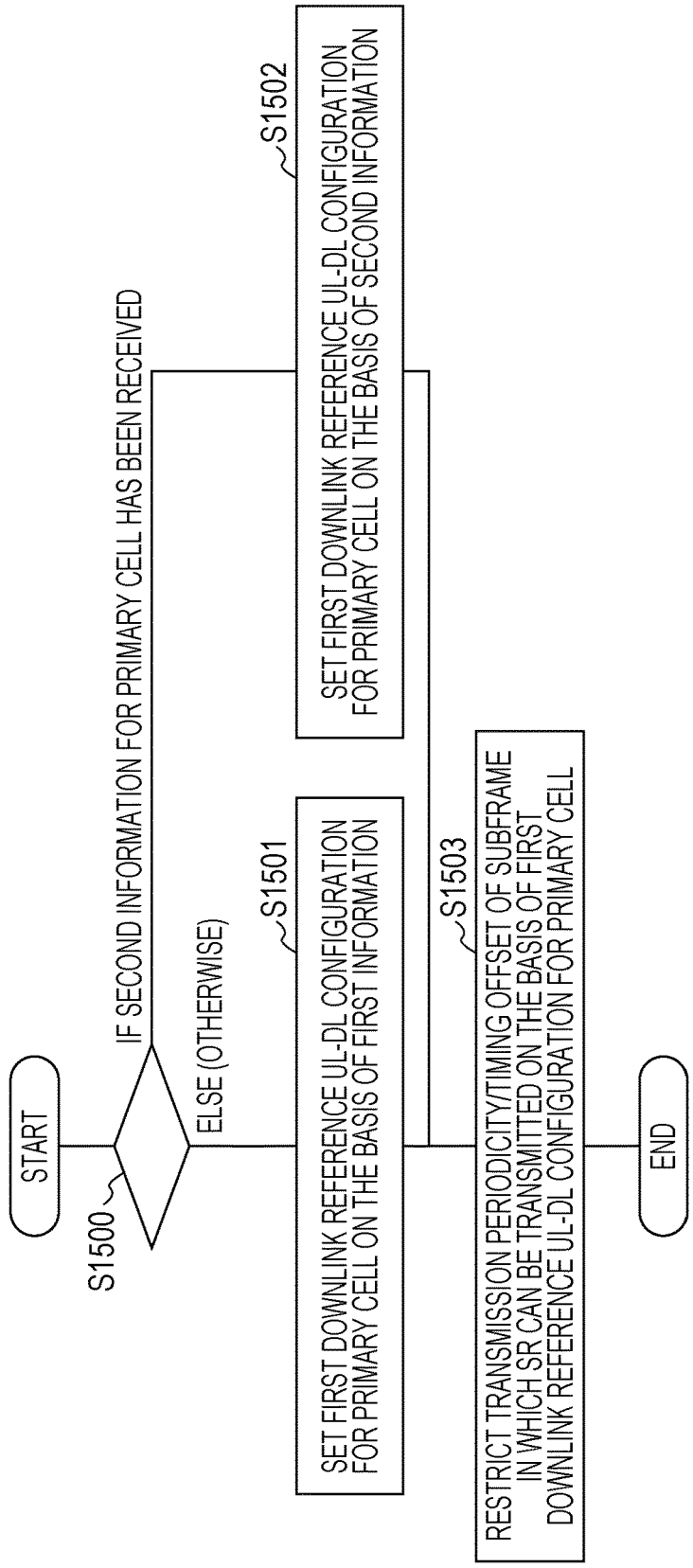

TERMINAL DEVICE, BASE STATION DEVICE, INTEGRATED CIRCUIT, AND RADIO COMMUNICATION METHOD

TECHNICAL FIELD

The present invention relates to a terminal apparatus, a base station apparatus, an integrated circuit, and a radio communication method.

This application claims the benefit of Japanese Patent Application No. 2013-128437 filed Jun. 19, 2013, the entire contents of which are incorporated herein by reference.

BACKGROUND ART

A radio access method and a radio network (hereinafter, referred to as Long-Term Evolution (LTE) or Evolved Universal Terrestrial Radio Access (EUTRA)) of cellular mobile communication have been examined in the Third Generation Partnership Project (3GPP). In LTE, an orthogonal frequency division multiplexing (OFDM) method is used for a downlink. In LTE, a single-carrier frequency division multiple access (SC-FDMA) method is used for an uplink. In LTE, a base station apparatus is also referred to as evolved NodeB (eNodeB), and a mobile station apparatus is also referred to as user equipment (UE). LTE is a cellular communication system in which a plurality of areas covered by a base station apparatus are allocated in a cell form. A single base station apparatus may manage a plurality of cells.

LTE corresponds to time division duplex (TDD). LTE employing the TDD is also referred to as TD-LTE or LTE TDD. The TDD is a technique which can realize full-duplex communication in a single frequency band through time division multiplexing of an uplink signal and a downlink signal.

In the 3GPP, it has been examined that a traffic adaptation technique and an interference reduction technique (DL-UL interference management and traffic adaptation) in which a ratio of an uplink resource and a downlink resource is changed depending on uplink traffic and downlink traffic are applied to the TD-LTE.

In NPL 1, a method of using a flexible subframe is proposed as a method of realizing traffic adaptation. A base station apparatus can receive an uplink signal or transmit a downlink signal in a flexible subframe. In NPL 1, a mobile station apparatus regards the flexible subframe as a downlink subframe unless the mobile station apparatus is instructed to transmit an uplink signal in the flexible subframe by the base station apparatus. The traffic adaptation technique is also referred to as dynamic TDD.

NPL 1 discloses that a hybrid automatic repeat request (HARQ) timing for a physical downlink shared channel (PDSCH) is determined on the basis of an uplink-downlink configuration which is newly introduced, and that HARQ timing for a physical uplink shared channel (PUSCH) is determined on the basis of the initial UL-DL configuration.

NPL 2 discloses that (a) a UL/DL reference configuration is introduced, and (b) several subframes may be scheduled to be used for either an uplink or a downlink through dynamic grant/assignment from a scheduler.

In LTE release 10, a carrier aggregation technique is introduced in which a plurality of cells are set for a mobile station apparatus.

CITATION LIST

NPL 1: "On standardization impact of TDD UL-DL adaptation", R1-122016, Ericsson, ST-Ericsson, 3GPP TSG-RAN WG1 Meeting #69, Prague, Czech Republic, 21 to 25 May 2012.

NPL 2: "Signaling support for dynamic TDD", R1-130558, Ericsson, ST-Ericsson, 3GPP TSG-RAN WG1 Meeting #72, St Julian's, Malta, 28 Jan. to 1 Feb. 2013.

DISCLOSURE OF THE INVENTION

Problems to be Solved by the Invention

Throughput can be considerably improved in a case where the dynamic TDD is applied compared with a case where the ratio of an uplink resource and a downlink resource is not changed. However, in a radio communication system which employs the dynamic TDD, in a case where an uplink-downlink configuration applied to a mobile station apparatus which transmits an uplink control signal is different from an uplink-downlink configuration applied to another mobile station apparatus inside or outside a cell, there is a problem in that a downlink signal which is transmitted by another mobile station apparatus at the same time interferes with the uplink control signal, and thus a reception characteristic of the uplink control signal deteriorates.

An aspect of the present invention has been made in consideration of the problem, and an object thereof is to provide a terminal apparatus an integrated circuit, and a radio communication method capable of avoiding interference with a downlink signal and transmitting an uplink control signal in a radio communication system which employs dynamic TDD.

Means for Solving the Problems (1) In order to achieve the above-described object, the present invention provides the following means. In other words, according to an aspect of the present invention, there is provided a terminal apparatus which performs periodic channel state information reporting to a base station apparatus, the terminal apparatus including a reception unit that receives first information, second information, and index information indicating a value for reporting periodicity of the channel state information, from the base station apparatus; and a transmission control unit that determines the value for reporting periodicity of the channel state information on the basis of the index information, in which the applicable value is based on a certain UL-DL configuration, in which, in a case where the second information is not configured, the certain UL-DL configuration is a UL-DL configuration indicated by the first information, and in which, in a case where the second information is configured, the certain UL-DL configuration is a UL-DL configuration indicated by the second information.

(2) In addition, in the aspect of the present invention, the reception unit of the terminal apparatus receives third information, and a UL-DL configuration indicated by the third information is used for the channel state information measurement.

(3) Further, in the aspect of the present invention, each of the first information and the second information in the terminal apparatus corresponds to a primary cell.

(4) In addition, in the aspect of the present invention, in a case where the second information is configured, a scheduling timing of a physical uplink shared channel in the terminal apparatus is set according to a UL-DL configuration indicated by the first information, and a downlink HARQ timing in the terminal apparatus is set according to a UL-DL configuration indicated by the second information.

(5) Further, in the aspect of the present invention, in a case where the second information is configured, an uplink scheduling timing and a downlink HARQ timing in the terminal apparatus are set according to a UL-DL configuration indicated by the first information.

(6) In addition, in the aspect of the present invention, the index information in the terminal apparatus indicates an offset value for the channel state information reporting.

(7) Further, according to another aspect of the present invention, there is provided a base station apparatus which receives periodic channel state information reporting from a terminal apparatus, the base station apparatus including a CSI transmission timing determination unit that generates index information indicating a value for reporting periodicity of the channel state information; and a transmission unit that transmits first information, second information, and the index information to the terminal apparatus, in which the applicable value is based on a certain UL-DL configuration, in which, in a case where the second information is configured, a scheduling timing of a physical uplink shared channel is set according to a UL-DL configuration indicated by the first information, a downlink HARQ timing is set according to a UL-DL configuration indicated by the second information, and the certain UL-DL configuration is the UL-DL configuration indicated by the second information.

(8) In addition, in the aspect of the present invention, in a case where the second information is not configured, an uplink scheduling timing and a downlink HARQ timing in the base station apparatus are set according to a UL-DL configuration indicated by the first information, and the certain UL-DL configuration is the UL-DL configuration indicated by the first information.

(9) Further, in the aspect of the present invention, the transmission unit of the base station apparatus transmits third information, and a UL-DL configuration indicated by the third information is used for the channel state information measurement.

(10) In addition, in the aspect of the present invention, each of the first information and the second information in the base station apparatus corresponds to a primary cell.

(11) Further, in the aspect of the present invention, the index information generated by the CSI transmission timing determination unit of the base station apparatus indicates an offset value for the channel state information reporting.

(12) In addition, according to still another aspect of the present invention, there is provided an integrated circuit mounted in a terminal apparatus which performs periodic channel state information reporting to a base station apparatus, the integrated circuit causing the terminal apparatus to realize a series of functions including a function of receiving first information, second information, and index information indicating a value for reporting periodicity of the channel state information, from the base station apparatus; and a function of determining the value for reporting periodicity of the channel state information on the basis of the index information, in which the applicable value is based on a certain UL-DL configuration, in which, in a case where the second information is not configured, the certain UL-DL configuration is a UL-DL configuration indicated by the first information, and in which, in a case where the second information is configured, the certain UL-DL configuration is a UL configuration indicated by the second information.

(13) Further, according to still another aspect of the present invention, there is provided an integrated circuit mounted in a base station apparatus which receives periodic channel state information reporting from a terminal apparatus, the integrated circuit causing the base station apparatus to realize a series of functions including a function of generating index information indicating a value for reporting periodicity of the channel state information; and a function of transmitting first information, second information, and the index information to the terminal apparatus, in which the applicable value is based on a certain UL-DL configuration, in which, in a case where the second information is configured, a scheduling timing of a physical uplink shared channel is set according to a UL-DL configuration indicated by the first information, a downlink HARQ timing is set according to a UL-DL configuration indicated by the second information, and the certain UL-DL configuration is the UL-DL configuration indicated by the second information.

(14) In addition, according to still another aspect of the present invention, there is provided a radio communication method used for a terminal apparatus which performs periodic channel state information reporting to a base station apparatus, the method including receiving first information, second information, and index information indicating a value for reporting periodicity of the channel state information, from the base station apparatus; and determining the value for reporting periodicity of the channel state information on the basis of the index information, in which the applicable value is based on a certain UL-DL configuration, in which, in a case where the second information is not configured, the certain UL-DL configuration is a UL-DL configuration indicated by the first information, and in which, in a case where the second information is configured, the certain UL-DL configuration is a UL-DL configuration indicated by the second information.

(15) Further, according to still another aspect of the present invention, there is provided a radio communication method used for a base station apparatus which receives periodic channel state information reporting from a terminal apparatus, the method including generating index information indicating a value for reporting periodicity of the channel state information; and transmitting first information, second information, and the index information to the terminal apparatus, in which the applicable value is based on a certain UL-DL configuration, in which, in a case where the second information is configured, a scheduling timing of a physical uplink shared channel is set according to a UL-DL configuration indicated by the first information, downlink HARQ timing is set according to a UL-DL configuration indicated by the second information, and the certain UL-DL configuration is the UL-DL configuration indicated by the second information.

Effects of the Invention

According to an aspect of the present invention, it is possible to avoid interference with a downlink signal and to transmit an uplink control signal in a radio communication system which employs dynamic TDD.

BRIEF DESCRIPTION OF THE DRAWINGS

FIG. 7 is a table illustrating an example of an uplink-downlink configuration in the present embodiment.

FIG. 10 is a diagram illustrating a correspondence between a pair formed by the first uplink reference UL-DL configuration for the other serving cell (primary cell) and the first uplink reference UL-DL configuration for a serving cell (secondary cell), and the second uplink reference UL-DL configuration for the secondary cell in the present embodiment.

FIG. 12 is a diagram illustrating a correspondence between a pair formed by the first downlink reference UL-DL configuration for a primary cell and the first downlink reference UL-DL configuration for a secondary cell, and the second downlink reference UL-DL configuration for the secondary cell, in the present embodiment.

FIG. 13 is a diagram illustrating a relationship between a subframe indicated by the first uplink reference UL-DL configuration and a subframe indicated by the first downlink reference UL-DL configuration in the present embodiment.

FIG. 14 is a diagram illustrating a relationship between a subframe indicated by the first uplink reference UL-DL configuration, a subframe indicated by the first downlink reference UL-DL configuration, and a subframe indicated by a transmission direction UL-DL configuration in the present embodiment.

FIG. 15 is a diagram illustrating a relationship between the first uplink reference UL-DL configuration, the first downlink reference UL-DL configuration, and the transmission direction UL-DL configuration in the present embodiment.

FIG. 16 is a diagram illustrating a correspondence between a subframe n in which PDCCH/EPDCCH/PHICH is allocated, and a subframe n+k in which a PUSCH corresponding to the PDCCH/EPDCCH/PHICH is allocated.

FIG. 17 is a diagram illustrating a correspondence between a subframe n in which a PHICH is allocated, and a subframe n−k in which a PUSCH corresponding to the PHICH is allocated, in the present embodiment.

FIG. 18 is a diagram illustrating a correspondence between a subframe n in which a PUSCH is allocated, and a subframe n+k in which a PHICH corresponding to the PUSCH is allocated, in the present embodiment. The mobile station apparatus 1 specifies (selects, determines) a value of k according to the table of FIG. 20.

FIG. 19 is a diagram illustrating a correspondence between a subframe n-k in which a PDSCH is allocated, and a subframe n in which a HARQ-ACK corresponding to the PDSCH is transmitted, in the present embodiment.

FIG. 20 is a diagram illustrating a relationship between a parameter $I_{CQI/PMI}$ of which a notification is sent in a high layer, the reporting periodicity $N_{pd}$ of a periodic CSI, and a timing offset $N_{OFFSET,CQI}$ in the present embodiment.

FIG. 22 is a diagram illustrating the first downlink reference UL-DL configuration, a subframe number serving as an uplink subframe, and a supported periodic CSI reporting periodicity in the present embodiment.

FIG. 26 is a diagram illustrating a relationship between a parameter $I_{SR}$ of which a notification is sent in a high layer, the periodicity $SR_{PERIODICITY}$ of a subframe in which an SR can be transmitted, and a timing offset $N_{OFFSET,SR}$ in the present embodiment.

FIG. 27 is a diagram illustrating the first downlink reference UL-DL configuration, a subframe number serving as an uplink subframe, and a periodicity of a subframe in which a supported SR can be transmitted in the present embodiment.

FIG. 28 is a flowchart illustrating an example of a process of restricting (a) periodicity/timing offset of a subframe in which the SR can be transmitted on the basis of the first downlink reference UL-DL configuration in the present embodiment.

MODE FOR CARRYING OUT THE INVENTION

Figure 1:
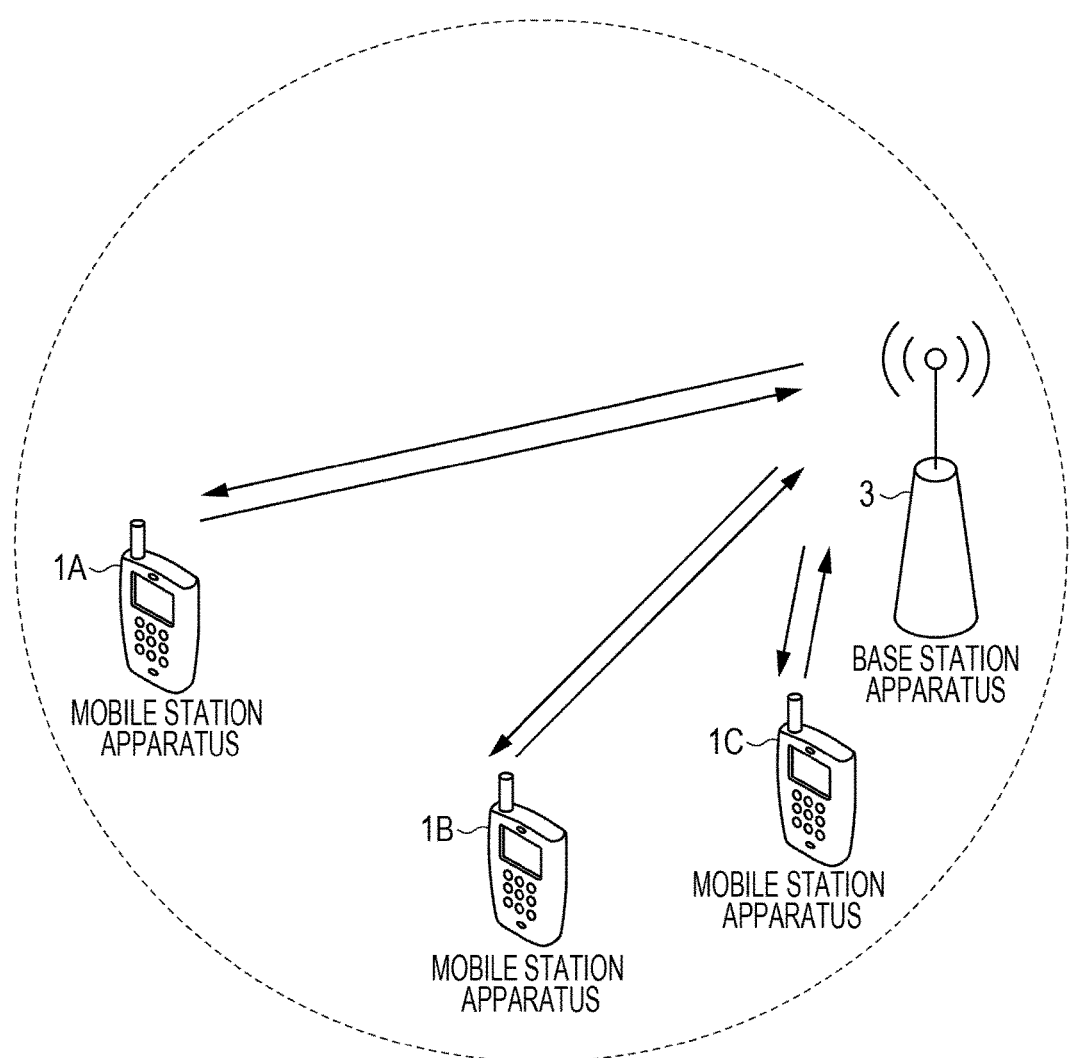
FIG. 1 is a conceptual diagram of a radio communication system of the present embodiment.

Hereinafter, embodiments of the present invention will be described.

In the present embodiment, a plurality of cells are set for a mobile station apparatus. A technique in which the mobile station apparatus performs communication via the plurality of cells is referred to as cell aggregation or carrier aggregation. The present invention may be applied to each of the plurality of cells set for the mobile station apparatus. In addition, the present invention may be applied to some of the plurality of set cells. The cell set for the mobile station apparatus is also referred to as a serving cell.

The plurality of set serving cells includes a single primary cell and one or a plurality of secondary cells. The primary cell is a serving cell on which an initial connection establishment procedure is performed, a serving cell on which a connection reestablishment procedure is started, or a cell which is indicated as a primary cell in a handover procedure. The secondary cell may be set when or after RRC connection is established.

A radio communication system of the present embodiment employs a time division duplex (TDD) method. In a case of cell aggregation, the TDD method may be applied to all of a plurality of cells or some of the cells.

In a case where a plurality of cells to which the TDD is applied are aggregated, a half-duplex TDD method or a full-duplex TDD method is applied thereto.

A mobile station apparatus of the half-duplex TDD method cannot simultaneously perform uplink transmission and downlink reception in the plurality of cells to which the TDD is applied. In a case of the half-duplex TDD, the mobile station apparatus does not simultaneously perform transmission and reception in a single primary cell in a certain band, or in a single primary cell and one or a plurality of secondary cells in a plurality of different bands.

In the full-duplex TDD method, the mobile station apparatus can simultaneously perform uplink transmission and downlink reception in a plurality of cells to which the TDD is applied. In a case of the full-duplex TDD, the mobile station apparatus can simultaneously perform transmission and reception in a plurality of serving cells in a plurality of different bands.

The mobile station apparatus transmits information indicating combinations of bands in which carrier aggregation is supported by the mobile station apparatus, to a base station apparatus. The mobile station apparatus transmits, to the base station apparatus, information indicating whether or not simultaneous transmission and reception in the plurality of serving cells in a plurality of different bands is supported in each of the combinations of bands.

In a case where a cell to which the TDD is applied and a cell to which frequency division duplex (FDD) is applied are aggregated, the present invention is applicable to the cell to which the TDD is applied.

In the present embodiment, "X/Y" indicates "X or Y". In the present embodiment, "X/Y" indicates "X and Y". In the present embodiment, "X/Y" indicates "X and/or Y".

FIG. 1 is a conceptual diagram of a radio communication system of the present embodiment. In FIG. 1, the radio communication system includes mobile station apparatuses 1A to 1C, and a base station apparatus 3. Hereinafter, the mobile station apparatuses 1A to 1C are referred to a "mobile station apparatus 1".

A physical channel and a physical signal of the present embodiment will be described.

In FIG. 1, the following uplink physical channels are used for uplink radio communication from the mobile station apparatus 1 to the base station apparatus 3. The uplink physical channels are used to transmit information which is output by a higher layer.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of downlink, a scheduling request (SR) indicating a request for a PUSCH resource, and acknowledgement (ACK)/negative acknowledgement ACK (NACK) for downlink data (transport block, downlink-shared channel: DL-SCH). The ACK/NACK is also referred to as a HARQ-ACK, HARQ feedback, or response information.

The PUSCH is a physical channel used to transmit uplink data (uplink-shared channel: UL-SCH). In addition, the PUSCH may be used to transmit the HARQ-ACK and/or the CSI along with the uplink data. Further, the PUSCH may be used to transmit only the CSI, or only the HARQ-ACK and the CSI.

The PRACH is a physical channel used to transmit a random access preamble. The PRACH is mainly used for the mobile station apparatus 1 to be synchronized with the base station apparatus 3 in a time domain. In addition, the PRACH is also used to indicate synchronization (timing adjustment) with an initial connection establishment procedure, a handover procedure, a connection reestablishment procedure, and uplink transmission, and to indicate a request for a PUSCH resource.

In FIG. 1, the following uplink physical signal is used for the uplink radio communication. The uplink physical signal is not used to transmit information output from a high layer but is used by a physical layer.

Uplink reference signal (UL RS)

In the present embodiment, the following two types of uplink reference signals are used.

Demodulation reference signal (DMRS)
Sounding reference signal (SRS)

The DMRS is related to transmission of the PUSCH or the PUCCH. The DMRS is subject to time division multiplexing with the PUSCH or the PUCCH. The base station apparatus 3 uses the DMRS to perform channel correction of the PUSCH or the PUCCH. Hereinafter, transmission of both of the PUSCH and the DMRS is simply referred to transmission of the PUSCH. Hereinafter, transmission of both of the PUCCH and the DMRS is simply referred to transmission of the PUCCH.

The SRS is not related to transmission of the PUSCH or the PUCCH. The base station apparatus 3 uses the SRS to measure an uplink channel state. The mobile station apparatus 1 transmits a first SRS in a first resource which is set by a high layer. In addition, in a case where information indicating a request for transmitting the SRS is received via a PDCCH, the mobile station apparatus 1 transmits a second SRS only once in a second resource which is set by the high layer. The first SRS is also referred to as a periodic SRS or a type 0 triggered SRS. The second SRS is also referred to as an aperiodic SRS or a type 1 triggered SRS. Transmission of the aperiodic SRS is scheduled by information indicating a request for transmission of the SRS.

In FIG. 1, the following downlink physical channels are used for downlink radio communication from the base station apparatus 3 to the mobile station apparatus 1. The downlink physical channels are used to transmit information output from a high layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to send a notification of master information block (MIB, or broadcast channel: BCH) which is used in common by the mobile station apparatuses 1. The MIB is transmitted at intervals of 40 ms, and the MIB is repeatedly transmitted with periodicity of 10 ms. Specifically, initial transmission of the MIB is performed in a subframe 0 of a radio frame satisfying SFN mod 4=0, and retransmission (repetition) of the MIB is performed in subframes 0 of all other radio frames. The SFN (system frame number) is a radio frame number. The MIB is system information. For example, the MIB includes information indicating the SFN.

The PCFICH is used to transmit information indicating a region (OFDM symbol) which is used to transmit the PDCCH.

The PHICH is used to transmit a HARQ indicator (HARQ feedback or response information) indicating an acknowledgement (ACK) or negative acknowledgement (NACK) of uplink data (uplink shared channel: UL-SCH) received by the base station apparatus 3. For example, in a case where a HARQ indicator indicating an ACK is received, the mobile station apparatus 1 does not retransmit corresponding uplink data. For example, in a case where a HARQ indicator indicating a NACK is received, the mobile station apparatus 1 retransmits corresponding uplink data. A single PHICH transmits a HARQ indicator for a single item of uplink data. The base station apparatus 3 transmits respective HARQ indicators for a plurality of uplink data items included in the same PUSCH, by using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling a single PDSCH in a single cell. The downlink grant is used for scheduling a PDSCH in the same subframe as a subframe in which the downlink grant is transmitted. The uplink grant is used for scheduling a single PUSCH in a single cell. The uplink grant is used for scheduling a single PUSCH in a subframe which occurs four or more subframes later than a subframe in which the uplink grant is transmitted.

A cyclic redundancy check (CRC) parity bit is added to the DCI format. The CRC parity bit is scrambled with a cell-radio network temporary identifier (C-RNTI), or a semi-persistent scheduling cell-radio network temporary identifier (SPS C-RNTI). The C-RNTI and the SPS C-RNTI are identifiers for identifying a mobile station apparatus in a cell.

The C-RNTI is used to control the PDSCH or the PUSCH in a single subframe. The SPS C-RNTI is used to periodically allocate a PDSCH or PUSCH resource.

The PDSCH is used to transmit downlink data (downlink shared channel: DL-SCH).

The PMCH is used to transmit multicast data (multicast channel: MCH).

In FIG. 1, the following downlink physical signals are used for the downlink radio communication. The downlink physical signals are not used to transmit information output from a high layer but are used by a physical layer.

Synchronization signal (SS)
Downlink reference signal (DL RS)

The synchronization signal is used for the mobile station apparatus 1 to perform synchronization of a frequency domain and a time domain of downlink. In the TDD method, the synchronization signal is mapped in subframes 0, 1, 5 and 6 of a radio frame. In the FDD method, the synchronization signal is mapped in subframes 0 and 5 of a radio frame.

The downlink reference signal is used for the mobile station apparatus 1 to perform channel correction of the downlink physical channel. The downlink reference signal is used for the mobile station apparatus 1 to calculate channel state information of downlink.

In the present embodiment, the following five types of downlink reference signals are used.

Cell-specific reference signal (CRS)
UE-specific reference signal (URS) related to a PDSCH
Demodulation reference signal (DMRS) related to an EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted with all subframes. The CRS is used to demodulate PBCH/PDCCH/PHICH/PCFICH/PDSCH. The CRS may be used for the mobile station apparatus 1 to calculate channel state information of downlink. The PBCH/PDCCH/PHICH/PCFICH are (is) transmitted via an antenna port which is used to transmit the CRS.

The URS related to a PDSCH is transmitted with a subframe and a band which are used to transmit the PDSCH to which the URS is related. The URS is used to demodulate a PDSCH to which the URS is related.

The PDSCH is transmitted via an antenna port which is used to transmit a CRS or a URS. A DCI format 1A is used for scheduling a PDSCH which is transmitted via an antenna port used to transmit a CRS. A DCI format 2D is used for scheduling a PDSCH which is transmitted via an antenna port used to transmit a URS.

The DMRS related to an EPDCCH is transmitted with a subframe and a band which are used to transmit the EPDCCH to which the DMRS is related. The DMRS is used to demodulate an EPDCCH to which the DMRS is related. The EPDCCH is transmitted via an antenna port which is used to transmit the DMRS.

The NZP CSI-RS is transmitted in a set subframe. A resource in which the NZP CSI-RS is transmitted is set by the base station apparatus. The NZP CSI-RS is used for the mobile station apparatus 1 to calculate channel state information of downlink.

A resource of the ZP CSI-RS is set by the base station apparatus. The base station apparatus transmits the ZP CSI-RS with zero output. In other words, the base station apparatus does not transmit the ZP CSI-RS. The base station apparatus does not transmit a PDSCH and an EPDCCH in a set resource of the NZP CSI-RS. For example, the mobile station apparatus 1 can measure interference in a resource corresponding to the NZP CSI-RS in a certain cell.

The MBSFN RS is transmitted in all bands of a subframe which is used to transmit the PMCH. The MBSFN RS is used to decode the PMCH. The PMCH is transmitted via an antenna port which is used to transmit the MBSFN RS.

The PRS is used for the mobile station apparatus to measure a geographical position thereof.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to a physical signal.

The BCH, the MCH, the UL-SCH and the DL-SCH are transport channels. A channel used by a medium access control (MAC) layer is referred to as a transport channel. The unit of the transport channel used by the MAC layer is referred to as a transport block (TB) or a MAC protocol data unit (PDU). In the MAC layer, control of a hybrid automatic repeat request (HARQ) is performed on each transport block. The transport block is the unit of data which is delivered to a physical layer by the MAC layer. In the physical layer, the transport block is mapped to a codeword, and a coding process is performed on each codeword.

Hereinafter, a configuration of the radio frame of the present embodiment will be described.

Figure 2:
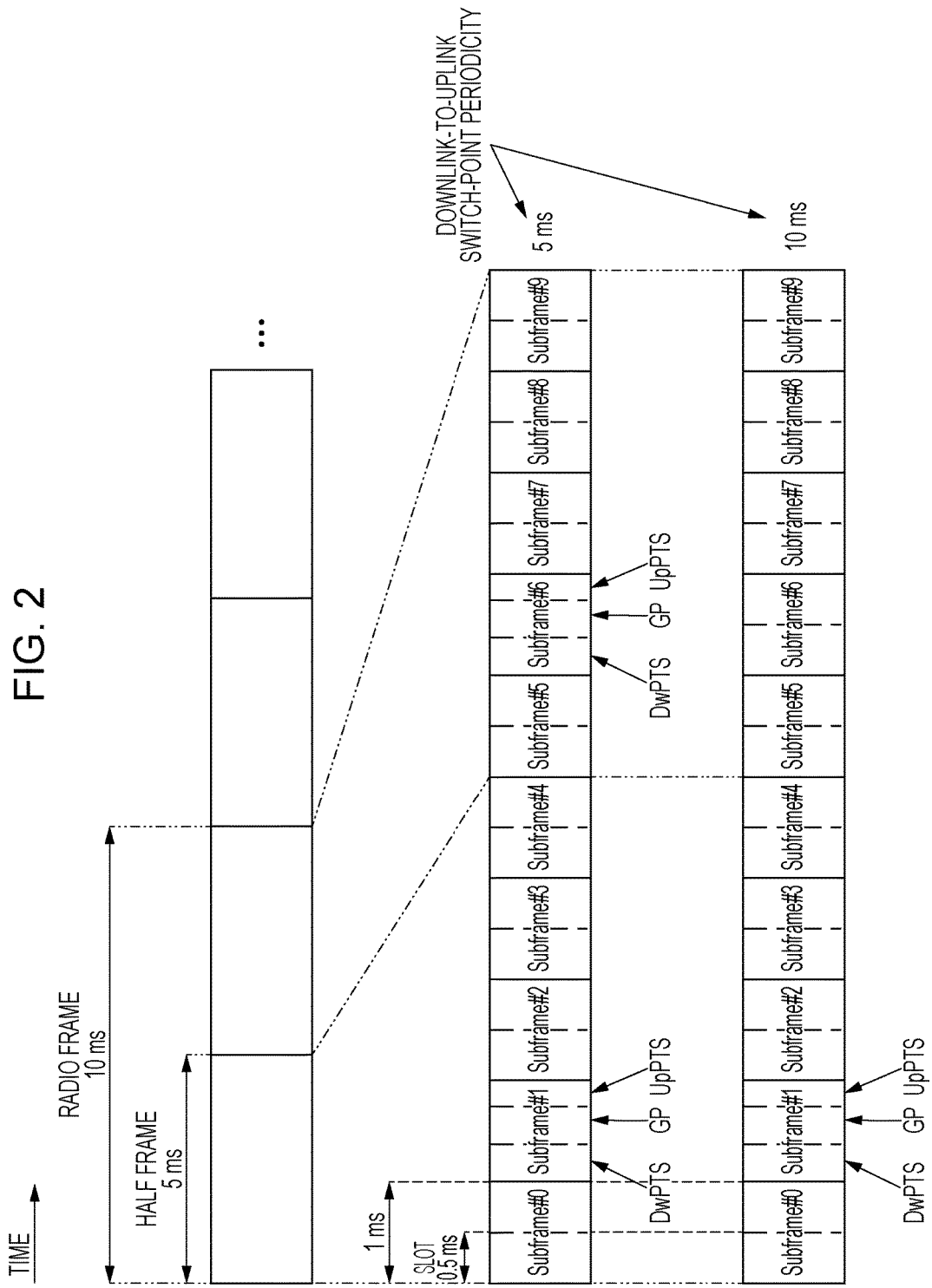
FIG. 2 is a diagram illustrating a schematic configuration of a radio frame of the present embodiment.

FIG. 2 is a diagram illustrating a schematic configuration of the radio frame of the present embodiment. Each radio frame has a length of 10 ms. In FIG. 2, a transverse axis is a time axis. In addition, each radio frame is constituted by two half frames. Each of the half frames has a length of 5 ms.

Each of the half frames is constituted by five subframes. Each of the subframes has a length of 1 ms and is defined by two continuous slots. Each of the slots has a length of 0.5 ms. An i-th subframe of the radio frame is constituted by a (2×i)-th slot and a (2×i+1)-th slot. In other words, ten subframes can be used at intervals of 10 ms.

In the present embodiment, the following three types of subframes are defined.

Downlink subframe (first subframe)
Uplink subframe (second subframe)
Special subframe (third subframe)

The downlink subframe is a subframe which is reserved for downlink transmission. The uplink subframe is a subframe which is reserved for uplink transmission. The special subframe is constituted by three fields. The three fields are a downlink pilot time slot (DwPTS), a guard period (GP), and an uplink pilot time slot (UpPTS). A total length of the DwPTS, the GP, and the UpPTS is 1 ms. The DwPTS is a field which is reserved for downlink transmission. The UpPTS is a field which is reserved for uplink transmission. The GP is a field in which downlink transmission and uplink transmission are not performed. In addition, the special subframe may consist of only the DwPTS and GP, and may consist of only the GP and the UpPTS.

A single radio frame is constituted by at least a downlink subframe, an uplink subframe, and a special subframe.

The radio communication system of the present embodiment supports the downlink-to-uplink switch-point periodicities of 5 ms and 10 ms.

In a case where the downlink-to-uplink switch-point periodicity is 5 ms, a special subframe is included in both half frames of the radio frame.

In a case where the downlink-to-uplink switch-point periodicity is 10 ms, a special subframe is included only in the first half frame of the radio frame.

Hereinafter, a configuration of the slot of the present embodiment will be described.

Figure 3:
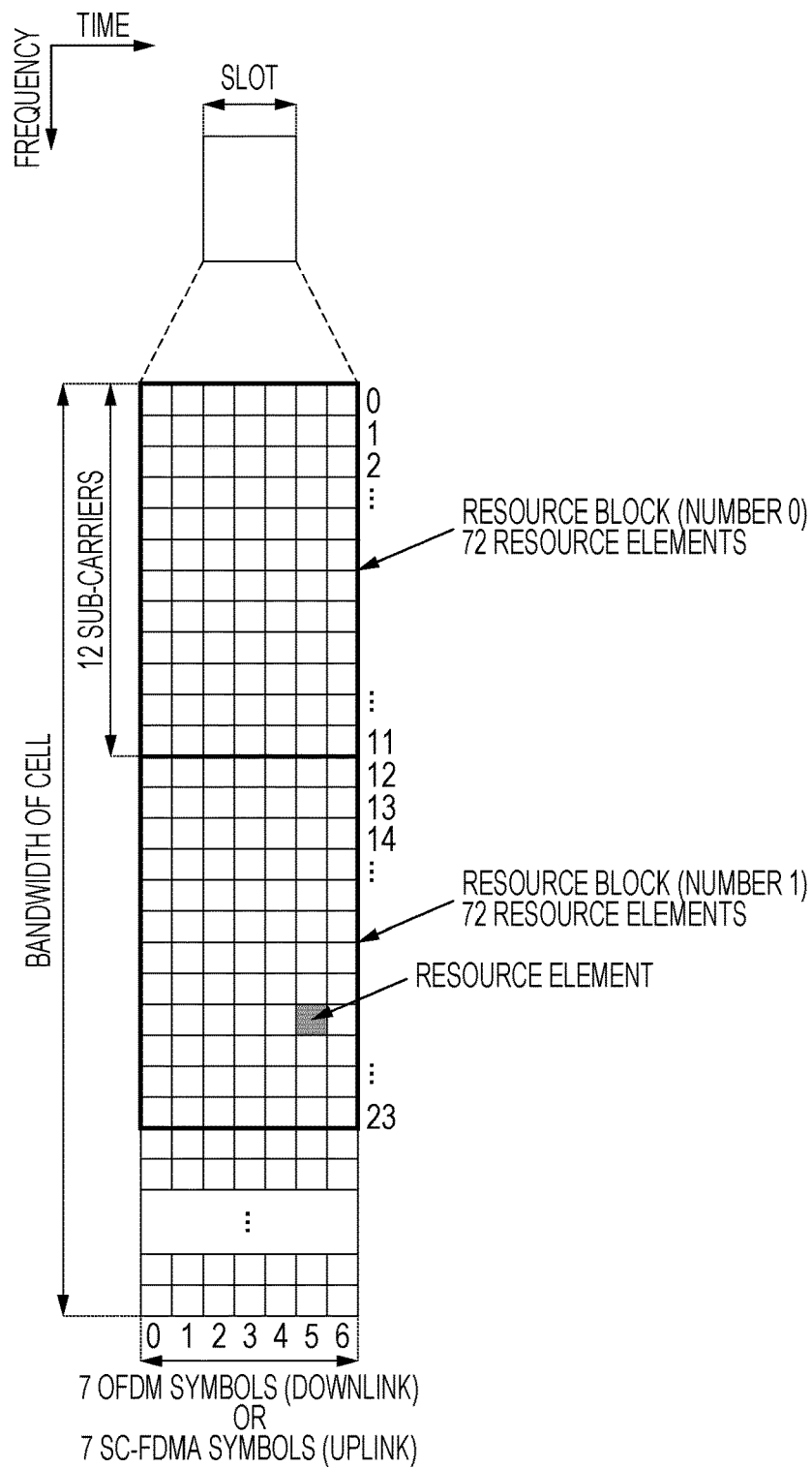
FIG. 3 is a diagram illustrating a configuration of a slot of the present embodiment.

FIG. 3 is a diagram illustrating a configuration of the slot of the present embodiment. A physical signal or a physical channel transmitted in each slot is expressed by a resource grid. In FIG. 3, a transverse axis is a time axis, and a longitudinal axis is a frequency axis. In a downlink, the resource grid is defined by a plurality of subcarriers and a plurality of OFDM symbols. In an uplink, the resource grid is defined by a plurality of subcarriers and a plurality of SC-FDMA symbols. The number of subcarriers forming a single slot depends on a bandwidth of a cell. The number of OFDM symbols or SC-FDMA symbols forming a single slot is seven. Each of elements of the resource grid is referred to as a resource element. The resource element is identified by using a subcarrier number and an OFDM symbol number or an SC-FDMA symbol number.

A resource block is used to express mapping of a certain physical channel (a PDSCH, a PUSCH, or the like) to a resource element. The resource block includes a virtual resource block and a physical resource block. A certain physical channel is first mapped to the virtual resource block. Then, the virtual resource block is mapped to the physical resource block. A single physical resource block is defined by seven continuous OFDM symbols or SC-FDMA symbols in the time domain, and twelve contiguous subcarriers in the frequency domain. Therefore, a single physical resource block is constituted by (7×12) resource elements. In addition, a single physical resource block corresponds to a single slot in the time domain and corresponds to 180 kHz in the frequency domain. The physical resource block may be numbered from 0 in the frequency domain.

Hereinafter, a description will be made of a physical channel and a physical signal transmitted in each subframe.

Figure 4:
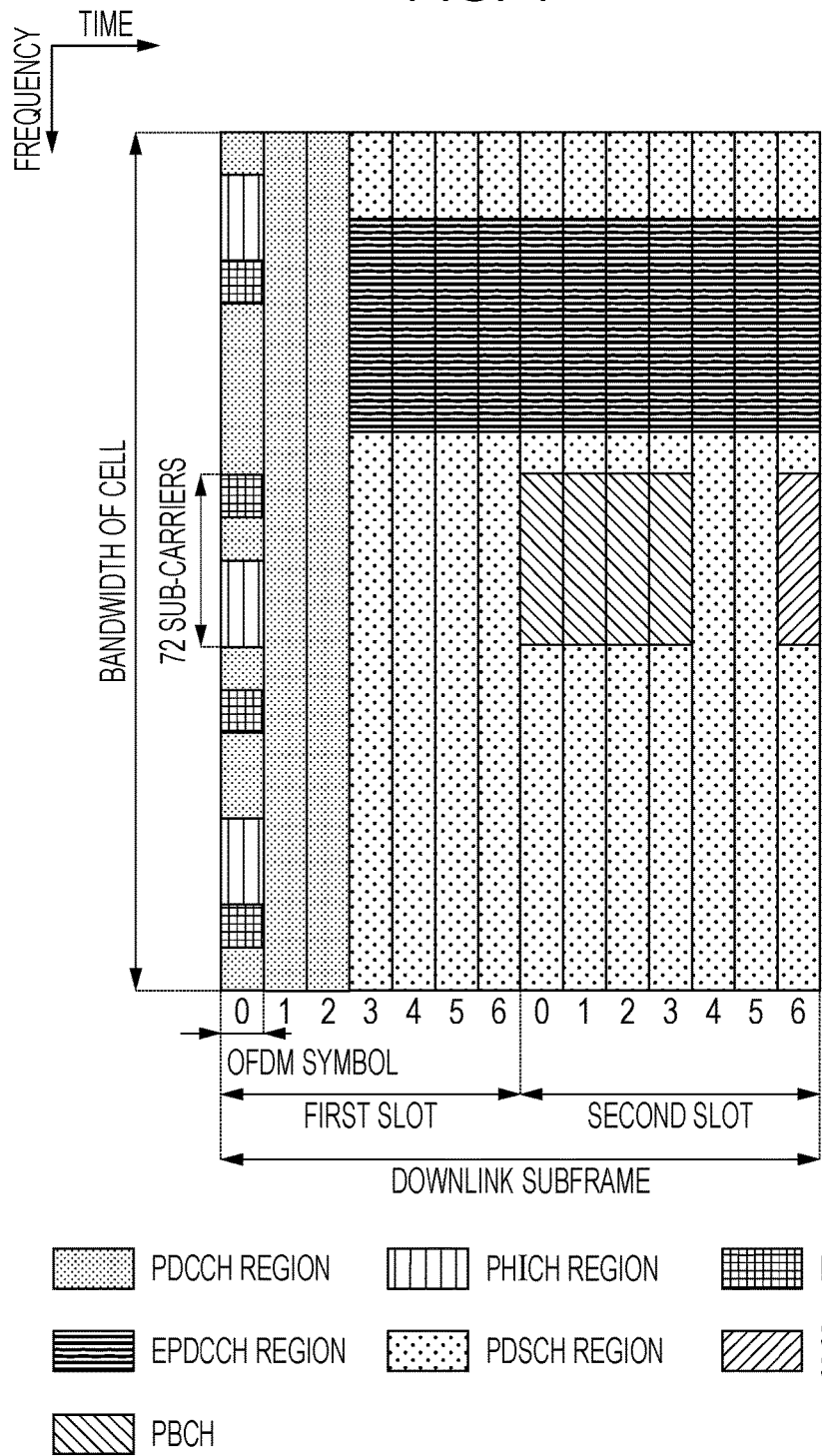
FIG. 4 is a diagram illustrating an example in which a physical channel and a physical signal are mapped in a downlink subframe of the present embodiment.

FIG. 4 is a diagram illustrating an example of an arrangement of physical channels and physical signals in a downlink subframe of the present embodiment. In FIG. 4, a transverse axis is a time axis, and a longitudinal axis is a frequency axis. The base station apparatus 3 may transmit the downlink physical channels (the PBCH, the PCFICH, the PHICH, the PDCCH, the EPDCCH, and the PDSCH) and the downlink physical signals (the synchronization signal and the downlink reference signal) in the downlink subframe. In addition, the PBCH is transmitted only in the subframe 0 of the radio frame. Further, the downlink reference signal is mapped in resource elements which are distributed in the frequency domain and the time domain. For simplification of description, the downlink reference signal is not illustrated in FIG. 4.

In a PDCCH region, a plurality of PDCCHs may be subject to frequency and time multiplexing. In an EPDCCH region, a plurality of EPDCCHs may be subject to frequency and time multiplexing. In a PDSCH region, a plurality of PDSCHs may be subject to frequency and time multiplexing. The PDCCH and the PDSCH or the EPDCCH may be subject to time multiplexing. The PDSCH and the EPDCCH may be subject to frequency multiplexing.

Figure 5:
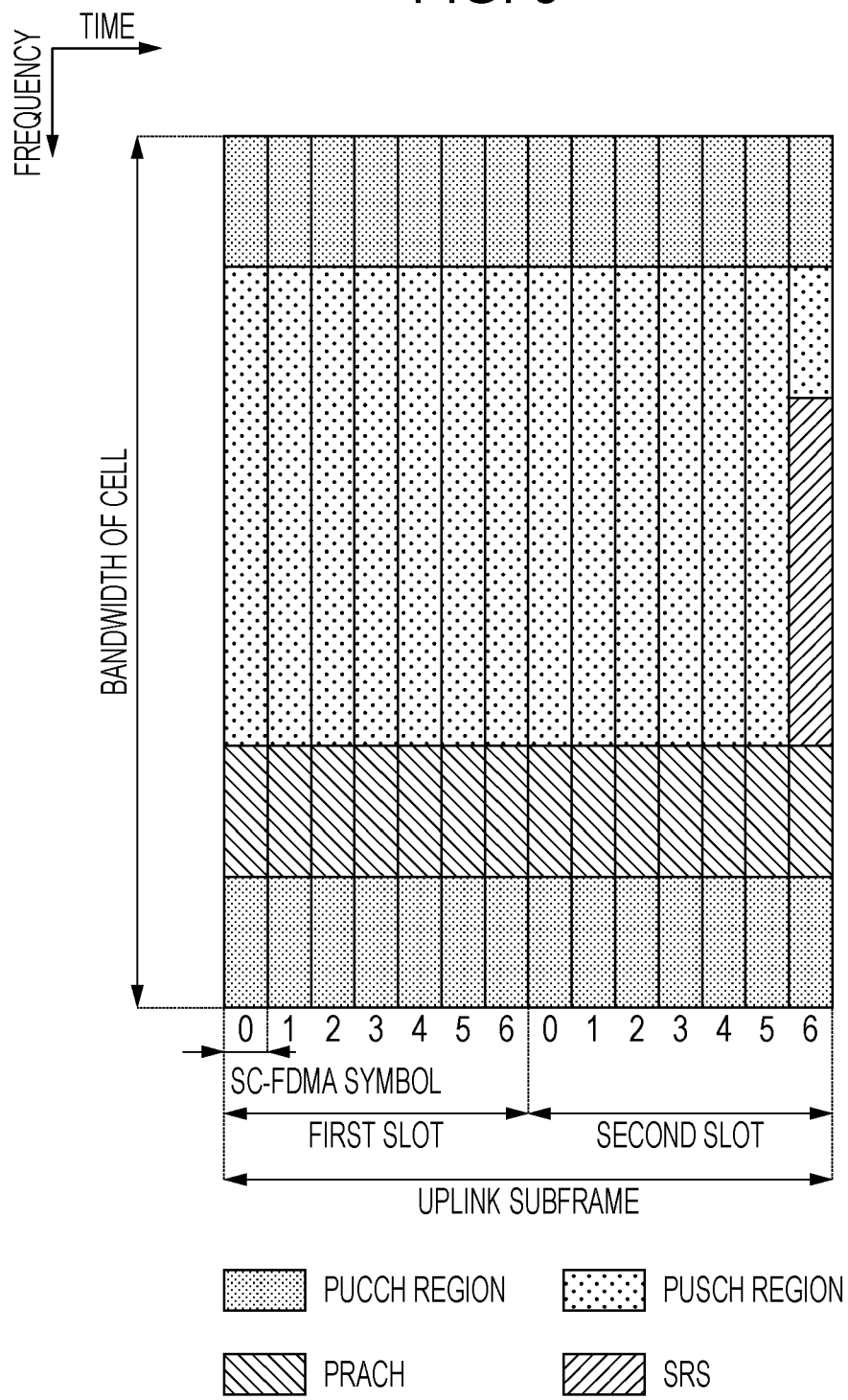
FIG. 5 is a diagram illustrating an example in which a physical channel and a physical signal are mapped in an uplink subframe of the present embodiment.

FIG. 5 is a diagram illustrating an example of an arrangement of physical channels and physical signals in an uplink subframe of the present embodiment. In FIG. 5, a transverse axis is a time axis, and a longitudinal axis is a frequency axis. The mobile station apparatus 1 may transmit the uplink physical channels (the PUCCH, the PUSCH, and the PRACH) and the uplink physical signals (the DMRS and the SRS). In a PUCCH region, a plurality of PUCCHs may be subject to frequency, time and code multiplexing. In a PUSCH region, a plurality of PUSCHs may be subject to frequency and spatial multiplexing in the uplink subframe. The PUCCH and the PUSCH may be subject to frequency multiplexing. The PRACH may be allocated in a single subframe or across two subframes. In addition, a plurality of PRACHs may be subject to code multiplexing.

The SRS is transmitted by using the last SC-FDMA symbol of the uplink subframe. In other words, the SRS is mapped in the last SC-FDMA symbol of the uplink subframe. The mobile station apparatus 1 cannot simultaneously transmit the SRS and the PUCCH/PUSCH/PRACH in a single SC-FDMA symbol of a single cell. In a single uplink subframe of a single cell, the mobile station apparatus 1 can transmit the PUSCH and/or the PUCCH by using SC-FDMA symbols excluding the last SC-FDMA symbol of the uplink subframe, and can transmit the SRS by using the last SC-FDMA symbol of the uplink subframe. In other words, in the single uplink subframe of the single cell, the mobile station apparatus 1 can transmit both the SRS and the PUSCH/PUCCH. In addition, the DMRS is subject to time multiplexing with the PUCCH or the PUSCH. For simplification of description, the DMRS is not illustrated in FIG. 5.

Figure 6:
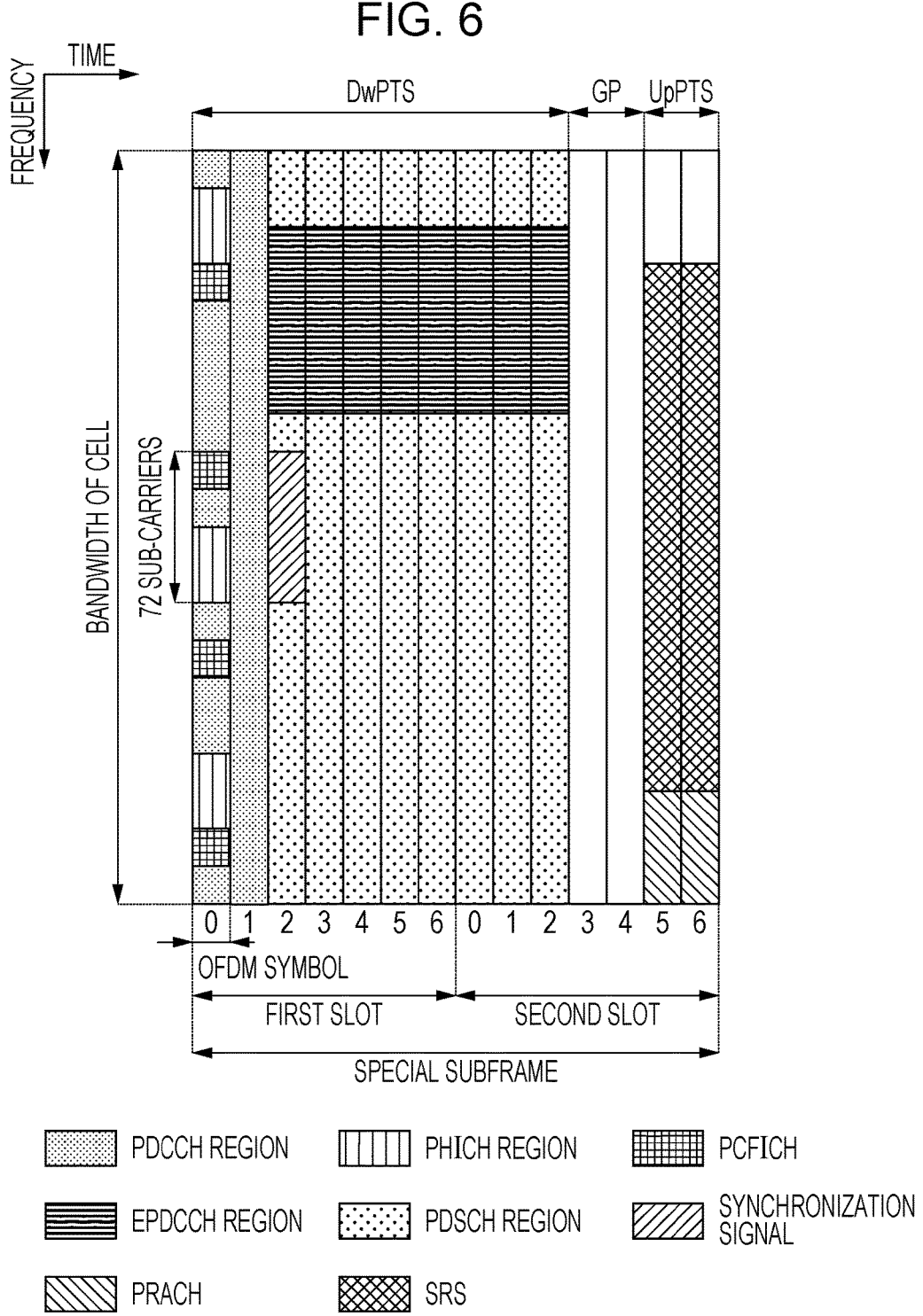
FIG. 6 is a diagram illustrating an example in which a physical channel and a physical signal are mapped in a special subframe of the present embodiment.

FIG. 6 is a diagram illustrating an example of an arrangement of physical channels and physical signals in a special subframe of the present embodiment. In FIG. 6, a transverse axis is a time axis, and a longitudinal axis is a frequency axis. In FIG. 6, the DwPTs is constituted by the first to tenth SC-FDMA symbols of the special subframe, the GP is constituted by the eleventh and twelfth SC-FDMA symbols of the special subframe, and the UpPTS is constituted by the thirteenth and fourteenth SC-FDMA symbols of the special subframe.

The base station apparatus 3 may transmit the PCFICH, the PHICH, the PDCCH, the EPDCCH, the PDSCH, the synchronization signal, and the downlink reference signal in the DwPTS of the special subframe. The base station apparatus 3 may not transmit the PBCH in the DwPTS of the special subframe. The mobile station apparatus 1 may transmit the PRACH and the SRS in the UpPTS of the special subframe. In other words, the mobile station apparatus 1 does not transmit the PUCCH, the PUSCH, and the DMRS in the UpPTS of the special subframe.

Hereinafter, a description will be made of the first uplink reference UL-DL configuration, the first downlink reference UL-DL configuration, the second uplink reference UL-DL configuration, the second downlink reference UL-DL configuration, and the transmission direction UL-DL configuration.

The first uplink reference UL-DL configuration, the first downlink reference UL-DL configuration, the second uplink reference UL-DL configuration, the second downlink reference UL-DL configuration, and the transmission direction UL-DL configuration are defined by an uplink-downlink configuration (UL-DL configuration).

The uplink-downlink configuration is a configuration related to a pattern of subframes of a radio frame. The uplink-downlink configuration indicates that each subframe of the radio frame is one of a downlink subframe, an uplink subframe, and a special subframe.

In other words, the first uplink reference UL-DL configuration, the first downlink reference UL-DL configuration, the second uplink reference UL-DL configuration, the second downlink reference UL-DL configuration, and the transmission direction UL-DL configuration are defined by patterns of the downlink subframe, the uplink subframe, and the special subframe of the radio frame.

The patterns of the downlink subframe, the uplink subframe, and the special subframe are those each of subframes #0 to #9 and indicate any one of the downlink subframe, the uplink subframe, and the special subframe, and, preferably, each subframe is represented by any combination in which D, U, and S (respectively indicating the downlink subframe, the uplink subframe, and the special subframe) have a length of 10. More preferably, a leading subframe (that is, the subframe #0) is D, and the second subframe (that is, the subframe #1) is S.

FIG. 7 is a table illustrating an example of an uplink-downlink configuration in the present embodiment. In FIG. 7, D indicates a downlink subframe, U indicates an uplink subframe, and S indicates a special subframe.

In FIG. 7, a subframe 1 of the radio frame is a special subframe at all times. In FIG. 7, subframes 0 to 5 are reserved for downlink transmission at all times, and the subframe 1 is reserved for uplink transmission at all times.

In FIG. 7, in a case where the downlink-to-uplink switch-point periodicity is 5 ms, a subframe 6 of the radio frame is a special subframe. In a case where the downlink-to-uplink switch-point periodicity is 10 ms, the subframe 6 of the radio frame is a downlink subframe.

The first uplink reference UL-DL configuration is also referred to as a first parameter, a first configuration, or a serving cell UL-DL configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

An uplink-downlink configuration i being set as the first or second uplink reference UL-DL configuration is referred to as first or second uplink reference UL-DL configuration i being set. An uplink-downlink configuration i is being set as the first or second downlink reference UL-DL configuration is referred to as first or second downlink reference UL-DL configuration i being set. An uplink-downlink configuration i being set as the transmission direction UL-DL configuration is referred to as a transmission direction UL-DL configuration i being set.

Hereinafter, a description will be made of a method of setting the first uplink reference UL-DL configuration, the first downlink reference UL-DL configuration, and the transmission direction UL-DL configuration.

The base station apparatus 3 sets the first uplink reference UL-DL configuration, the first downlink reference UL-DL configuration, and the transmission direction UL-DL configuration. The base station apparatus 3 may transmit first information (TDD-Config) indicating the first uplink reference UL-DL configuration, second information indicating the first downlink reference UL-DL configuration, and third information indicating the transmission direction UL-DL configuration, which include at least one of an MIB, a system information block type 1 message, a system information message, an RRC message, an MAC control element (CE), and control information (for example, a DCI format) of a physical layer. In addition, the base station apparatus 3 may include the first information, the second information, and the third information in at least one of the MIB, the system information block type 1 message, the system information message, the RRC message, the MAC control element (CE), and the control information (for example, a DCI format) of a physical layer, depending on circumstances.

The first uplink reference UL-DL configuration, the first downlink reference UL-DL configuration, the second uplink reference UL-DL configuration, the second downlink reference UL-DL configuration, and the transmission direction UL-DL configuration may be defined for each of a plurality of serving cells.

The base station apparatus 3 transmits the first information, the second information, and the third information for each serving cell, to the mobile station apparatus 1 for which a plurality of serving cells are set. In addition, the first information, the second information, and the third information may be defined for each serving cell.

The base station apparatus 3 may transmit, to the mobile station apparatus 1 for which two serving cells including a primary cell and a secondary cell, the first information for the primary cell, the second information for the primary cell, the third information for the primary cell, the first information for a secondary cell, the second information for the secondary cell, and the third information for the secondary cell.

The mobile station apparatus 1 for which the plurality of serving cells are set may set the first uplink reference UL-DL configuration, the first downlink reference UL-DL configuration, and the transmission direction UL-DL configuration in each serving cell on the basis of the first information, the second information, and the third information.

The mobile station apparatus 1 for which two serving cells including a primary cell and a secondary cell are set may set the first uplink reference UL-DL configuration for the primary cell, the first downlink reference UL-DL configuration for the primary cell, and the transmission direction UL-DL configuration the primary cell, the first uplink reference UL-DL configuration for the secondary cell, the first downlink reference UL-DL configuration for the secondary cell, and the transmission direction DL-UL configuration for the secondary cell.

The first information for the primary cell is preferably included in the system information block type 1 message, or the RRC message. The first information for the secondary cell is preferably included in the RRC message. The second information for the primary cell is preferably included in the system information block type 1 message, the system information message, or the RRC message. The second information for the secondary cell is preferably included in the RRC message. The third information is preferably included in the MIB, the MAC CE, or the control information (for example, a DCI format) of a physical layer.

The first information is preferably common to a plurality of mobile station apparatuses 1 in a cell. The second information may be common to the plurality of mobile station apparatuses 1 in the cell, and may be dedicated to the mobile station apparatus 1. The third information may be common to the plurality of mobile station apparatuses 1 in the cell, and may be dedicated to the mobile station apparatus 1.

The second information may be transmitted along with the first information. The mobile station apparatus 1 in which the first downlink reference UL-DL configuration is not set on the basis of the second information may not receive the third information.

The periodicity of changing the transmission direction UL-DL configuration is preferably shorter than the periodicity of changing the downlink reference UL-DL configuration. A frequency of changing the transmission direction UL-DL configuration is preferably lower than a frequency of changing the downlink reference UL-DL configuration. The periodicity of changing the downlink reference UL-DL configuration is preferably shorter than the periodicity of changing the uplink reference UL-DL configuration. A frequency of changing the downlink reference UL-DL configuration is preferably lower than a frequency of changing the uplink reference UL-DL configuration.

The system information block type 1 message is initially transmitted in the subframe 5 of a radio frame satisfying SFN mod 8=0, via a PDSCH, and undergoes retransmission (repetition) in the subframe 5 of another subframe satisfying SFN mod 2=0. The system information block type 1 message includes information indicating a configuration (lengths of a DwPTS, a GP, and a UpPTS) of a special subframe. The system information block type 1 message is cell-specific information.

The system information message is transmitted via the PDSCH. The system information message is cell-specific information. The system information message includes system information blocks X other than the system information block type 1 message.

The RRC message is transmitted via the PDSCH. The RRC message is information/signal which is processed in an RRC layer. The RRC may be common to a plurality of mobile station apparatuses 1 in a cell, and may be dedicated to a specified mobile station apparatus 1.

The MAC CE is transmitted via the PDSCH. The MAC CE is information/signal which is processed in an MAC layer.

In a case where an RRC message including the first information, and/or the second information, and/or the third information are (is) received via the PDSCH, the mobile station apparatus 1 preferably sets (makes valid) the first uplink reference UL-DL configuration, and/or the first downlink reference UL-DL configuration, and/or the transmission direction UL-DL configuration in a subframe (timing) in which an RRC connection reconfiguration completion message corresponding to the RRC message is transmitted.

In a case where an MIB including the first information, and/or the second information, and/or the third information is received via a PBCH in a subframe n–k, the mobile station apparatus 1 preferably sets (makes valid) the first uplink reference UL-DL configuration/the first downlink reference UL-DL configuration, and/or the transmission direction UL-DL configuration in a subframe n. For example, k is 4 or 8. For example, k is determined on the basis of a table of FIG. 19 and the present first or second downlink reference UL-DL configuration. FIG. 19 will be described later.

In a case where an MAC CE including the first information, and/or the second information, and/or the third information is received via a PDSCH in a subframe n–k, the mobile station apparatus 1 preferably sets (makes valid) the first uplink reference UL-DL configuration, and/or the first downlink reference UL-DL configuration, and/or the transmission direction UL-DL configuration in a subframe n. For example, k is 4 or 8. For example, a subframe n+k is a subframe for transmitting a HARQ-ACK (ACK) of the PDSCH which is used to transmit the MAC CE. For example, k is determined on the basis of the table of FIG. 19 and the present first or second downlink reference UL-DL configuration.

In a case where control information (for example, a DCI format) of a physical layer including the first information, and/or the second information, and/or the third information is received via a downlink physical channel (for example, a PDCCH/EPDCCH) in a subframe n–k, the mobile station apparatus 1 preferably sets (makes valid) the first uplink reference UL-DL configuration, and/or the first downlink reference UL-DL configuration, and/or the transmission direction UL-DL configuration in a subframe n. For example, k is 4 or 8. For example, a subframe n+k is a subframe for transmitting a HARQ-ACK (ACK) of the downlink physical channel (for example, a PDCCH/EPDCCH) which is used to transmit the control information (for example, a DCI format) of a physical layer. For example, k is determined on the basis of the table of FIG. 19 and the present first or second downlink reference UL-DL configuration.

In addition, the mobile station apparatus 1 which receives the first information for a certain serving cell and does not receive the second information for the certain serving cell, and the base station apparatus 3 which transmits the first information for the certain serving cell and does not transmit the second information for the certain cell may set the first downlink reference UL-DL configuration for the certain serving cell on the basis of the first information for the certain serving cell. The mobile station apparatus 1 may disregard the third information for the certain serving cell for which the first downlink reference UL-DL configuration is set on the basis of the first information.

Figure 8:
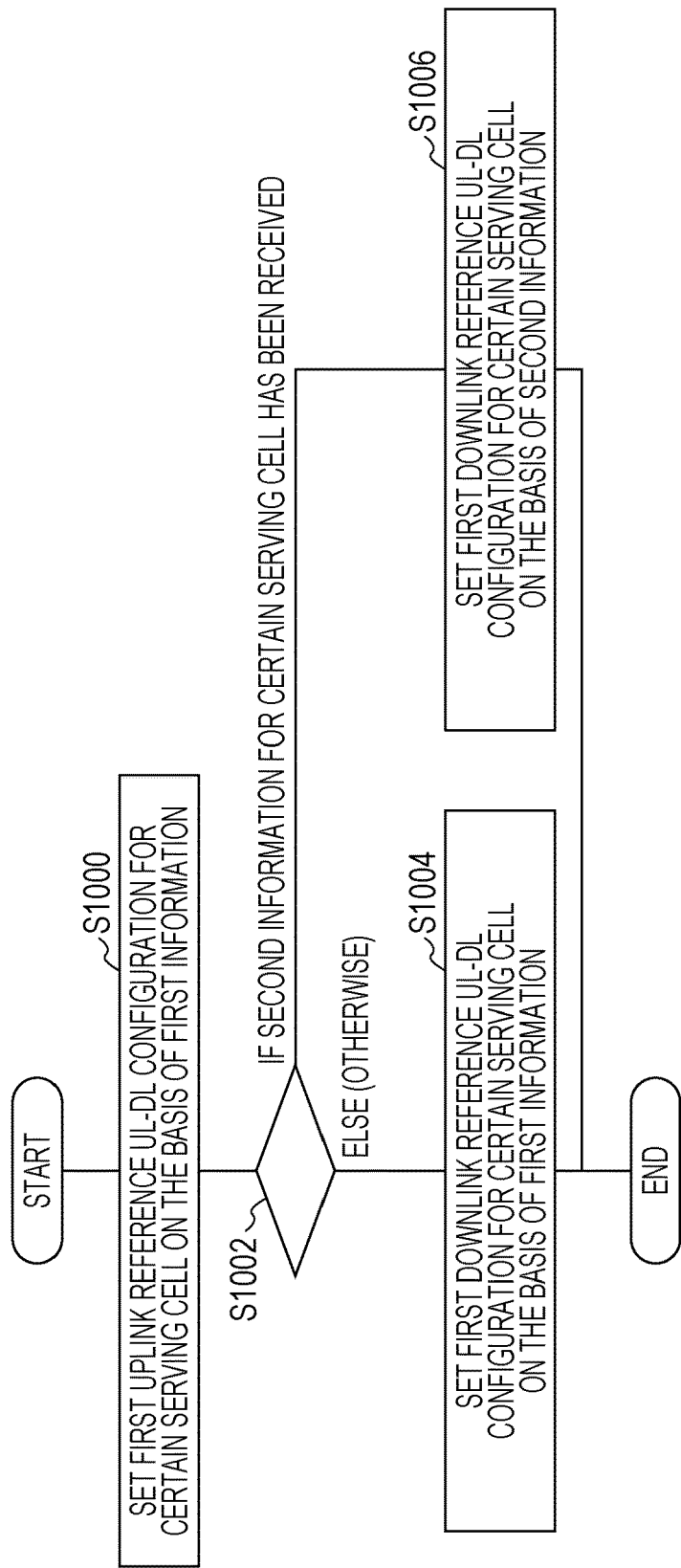
FIG. 8 is a flowchart illustrating a setting method of a first uplink reference UL-DL configuration and a first downlink reference UL-DL configuration in the present embodiment.

FIG. 8 is a flowchart illustrating a method of setting the first uplink reference UL-DL configuration and the first downlink reference UL-DL configuration in the present embodiment. The mobile station apparatus 1 performs the setting method illustrated in FIG. 8 on each of a plurality of serving cells.

The mobile station apparatus 1 sets the first uplink reference UL-DL configuration for a certain serving cell on the basis of the first information (S1000). The mobile station apparatus 1 determines whether or not the second information for the certain serving cell has been received (S1002). If the second information for the certain serving cell has been received, the mobile station apparatus 1 sets the first downlink reference UL-DL configuration for the certain serving cell on the basis of the second information for the certain serving cell (S1006). If the second information for the certain serving cell has not been received (else/otherwise), the mobile station apparatus 1 sets the first downlink reference UL-DL configuration for the certain serving cell on the basis of the first information for the certain serving cell (S1004).

A serving cell for which the first uplink reference UL-DL configuration and the first downlink reference UL-DL configuration are set on the basis of the first information is also referred to as a serving cell for which dynamic TDD is not set. A serving cell for which the first downlink reference UL-DL configuration is set on the basis of the second information is also referred to as a serving cell for which the dynamic TDD is set.

In a case where the first downlink reference UL-DL configuration is reset for a serving cell for which the transmission direction UL-DL configuration has been set, the mobile station apparatus 1 may clear/discard the transmission direction UL-DL configuration for the serving cell.

In addition, in a case where the first downlink reference UL-DL configuration which is reset for a serving cell for which the transmission direction UL-DL configuration has been set is the same as the previous first downlink reference UL-DL configuration, the mobile station apparatus 1 may not clear/discard the transmission direction UL-DL configuration. In other words, in a case where the first downlink reference UL-DL configuration for a serving cell for which the transmission direction UL-DL configuration has been set is changed, the mobile station apparatus 1 may clear/discard the transmission direction UL-DL configuration for the serving cell.

In a case where the base station apparatus 3 instructs the mobile station apparatus 1 to reset/change the first downlink reference UL-DL configuration for a serving cell for which the transmission direction UL-DL configuration has been set, it may be regarded that the transmission direction UL-DL configuration for the serving cell is cleared/discarded by the mobile station apparatus 1.

Further, in a case where the first uplink reference UL-DL configuration for a serving cell for which the first downlink reference UL-DL configuration and the transmission direction UL-DL configuration have been set is reset, the mobile station apparatus 1 may clear/discard the first downlink reference UL-DL configuration and the transmission direction UL-DL configuration.

In a case where the base station apparatus 3 instructs the mobile station apparatus 1 to reset/change the first uplink reference UL-DL configuration for a serving cell for which the first downlink reference UL-DL configuration and the transmission direction UL-DL configuration have been set is reset, it may be regarded that the first downlink reference UL-DL configuration and the transmission direction UL-DL configuration may be cleared/discarded by the mobile station apparatus 1.

The mobile station apparatus 1 receives the second information, determines a subframe in which an uplink signal can be transmitted on the basis of the second information, and then monitors whether or not the third information is received. If the third information is received, a subframe is determined in which an uplink signal can be transmitted on the basis of the third information.

For example, the base station apparatus 3 transmits the third information to the mobile station apparatus 1 by using (a) PDCCH/EPDCCH. The third information is used to control dynamic TDD operation in coverage of the base station apparatus 3 (cell). The third information is transmitted and received in a common search space (CSS) or a UE-specific search space (USS).

The CSS is a space in which the plurality of mobile station apparatuses 1 monitor (a) PDCCH/EPDCCH. The USS is a space which is defined on the basis of at least a C-RNTI. The C-RNTI is an identifier which is uniquely assigned to the mobile station apparatus 1.

The C-RNTI may be used to transmit a DCI format including the third information (information indicating a transmission direction of a subframe). An RNTI different from the C-RNTI and the SPS C-RNTI may be used to transmit a DCI format including the third information (information indicating a transmission direction of a subframe). The RNTI is also referred to as an X-RNTI. In other words, a CRC parity bit added to the DCI format including the third information is scrambled with the C-RNTI or the X-RNTI.

In addition, a subframe may be restricted which is used for the mobile station apparatus 1 to monitor the PDCCH/EPDCCH including the third information. The base station apparatus 3 may control a subframe which is used for the mobile station apparatus 1 to monitor the PDCCH/EPDCCH including the third information. The base station apparatus 3 may transmit, to the mobile station apparatus 1, information indicating the subframe used for the mobile station apparatus 1 to monitor the PDCCH/EPDCCH including the third information.

For example, the PDCCH/EPDCCH including the third information may be allocated at intervals of ten subframes. For example, the mobile station apparatus 1 monitors the third information at intervals of ten subframes. A subframe in which the PDCCH/EPDCCH including the third information may be determined in advance. For example, the third information may be mapped only in the subframe 0 or 5 of the radio frame.

The base station apparatus 3 transmits the third information only in a case where it is determined that the third information is necessary. For example, in a case where it is determined that the transmission direction UL-DL configuration is changed, the base station apparatus 3 transmits the third information. For example, in a case where it is determined that the mobile station apparatus 1 which starts a dynamic TDD operation is required to be notified of the third information, the base station apparatus 3 transmits the third information thereto.

The mobile station apparatus 1 which starts the dynamic TDD operation monitors the PDCCH/EPDCCH including the third information in a subframe in which the PDCCH/EPDCCH including the third information is allocated.

The mobile station apparatus 1 may monitor the third information only in a case where the mobile station apparatus is set to monitor the third information. For example, the mobile station apparatus 1 may monitor the third information only in a case where the first downlink reference configuration is set.

The mobile station apparatus 1 tries to decode a received signal and determines whether or not the PDCCH/EPDCCH including the third information is detected. In a case where the PDCCH/EPDCCH including the third information is detected, the mobile station apparatus 1 determines a subframe in which an uplink signal can be transmitted on the basis of the detected third information. In a case where the PDCCH/EPDCCH including the third information is not detected, the mobile station apparatus 1 may maintain a determination hitherto regarding a subframe in which an uplink signal can be transmitted.

Hereinafter, a description will be made of a method of setting the second uplink reference UL-DL configuration.

In a case where a plurality of serving cells are set for the mobile station apparatus 1, and the first uplink reference UL-DL configurations for at least two serving cells are different from each other, the mobile station apparatus 1 and the base station apparatus 3 set the second uplink reference UL-DL configuration.

Except for the case where a plurality of serving cells are set for the mobile station apparatus 1, and the first uplink reference UL-DL configurations for at least two serving cells are different from each other, the mobile station apparatus 1 and the base station apparatus 3 may not set the second uplink reference UL-DL configuration.

A case excluding the case where the first uplink reference UL-DL configurations for at least two serving cells are different from each other is a case where the first uplink reference UL-DL configurations for all the serving cells are the same as each other. In a case where a single serving cell is set for the mobile station apparatus 1, the mobile station apparatus 1 and the base station apparatus 3 may not set the second uplink reference UL-DL configuration.

Figure 9:
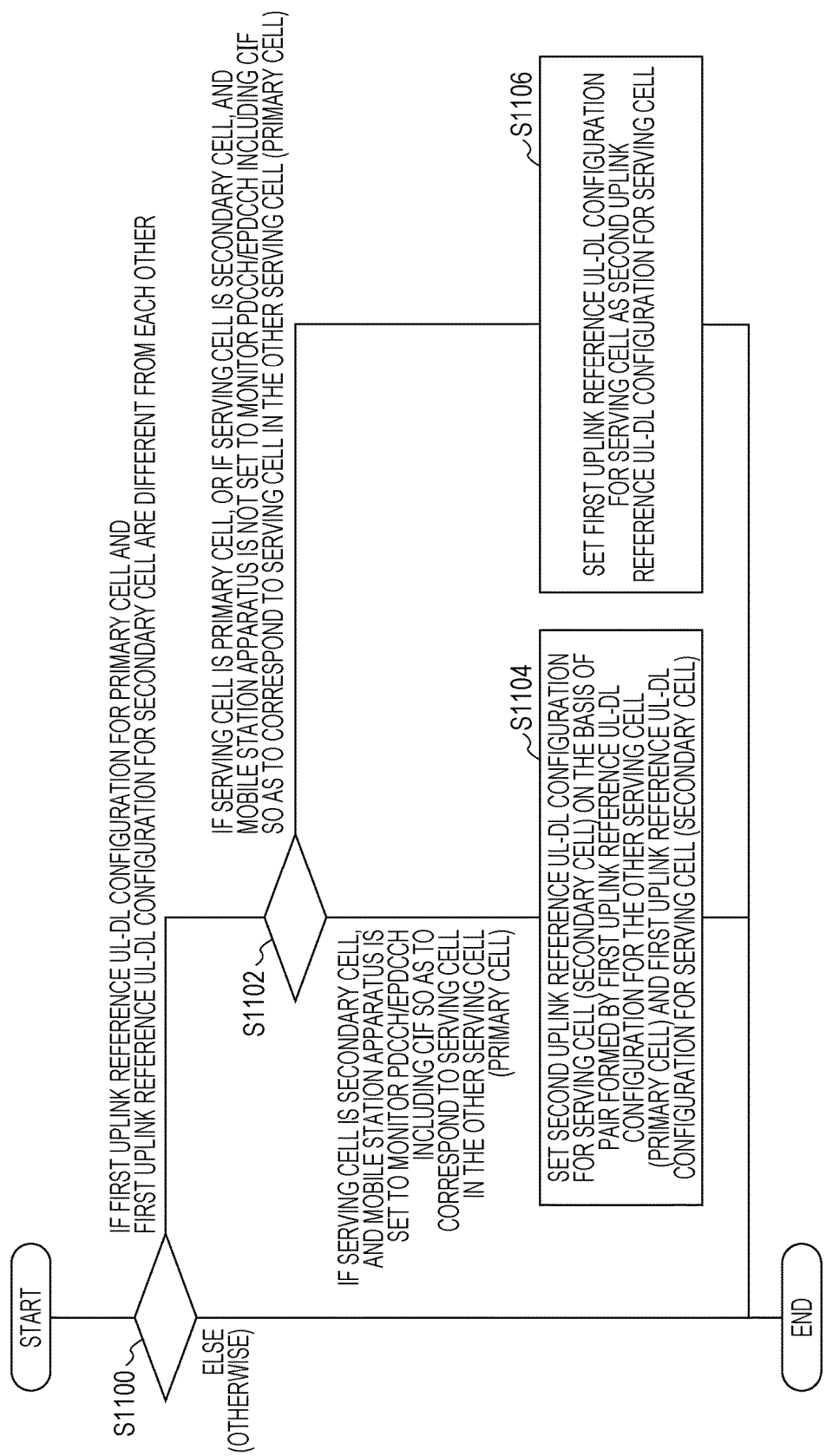
FIG. 9 is a flowchart illustrating a setting method of a second uplink reference UL-DL configuration in the present embodiment.

FIG. 9 is a flowchart illustrating a method of setting the second uplink reference UL-DL configuration in the present embodiment. In FIG. 9, a single primary cell and a single secondary cell are set for the mobile station apparatus 1. The mobile station apparatus 1 performs the setting method illustrated in FIG. 9 on each of the primary cell and the secondary cell.

The mobile station apparatus 1 determines whether or not the first uplink reference UL-DL configuration for the primary cell and the first uplink reference UL-DL configuration for the secondary cell are different from each other (S1100). If the first uplink reference UL-DL configuration for the primary cell and the first uplink reference UL-DL configuration for the secondary cell are the same as each other, the mobile station apparatus 1 does not set the second uplink reference UL-DL configuration, and finishes the setting process of the second uplink reference UL-DL configuration.

If the first uplink reference UL-DL configuration for the primary cell and the first uplink reference UL-DL configuration for the secondary cell are different from each other, the mobile station apparatus 1 determines whether a serving cell is the primary cell or the secondary cell, and/or whether or not the mobile station apparatus is set to monitor (a) PDCCH/EPDCCH including a carrier indicator field (CIF) so as to correspond to the serving cell in the other serving cell (S1102).

If the serving cell is the secondary cell, and the mobile station apparatus is set to monitor the PDCCH/EPDCCH including the CIF so as to correspond to the serving cell (secondary cell) in the other serving cell (primary cell), the mobile station apparatus 1 sets the second uplink reference UL-DL configuration for the serving cell (secondary cell) on the basis of a pair formed by the first uplink reference UL-DL configuration for the other serving cell (primary cell) and the first uplink reference UL-DL configuration for the serving cell (secondary cell) (S1104).

In S1104, the mobile station apparatus 1 sets the second uplink reference UL-DL configuration for the serving cell (secondary cell) on the basis of a table of FIG. 10. FIG. 10 is a diagram illustrating a correspondence between the pair formed by the first uplink reference UL-DL configuration for the other serving cell (primary cell) and the first uplink reference UL-DL configuration for the serving cell (secondary cell), and the second uplink reference UL-DL configuration for the secondary cell.

In FIG. 10, a primary cell UL-DL configuration is set by referring to the first uplink reference UL-DL configuration for the other serving cell (primary cell). In FIG. 10, a secondary cell UL-DL configuration is set by referring to the first uplink reference UL-DL configuration for the serving cell (secondary cell).

For example, in a case where the first uplink reference UL-DL configuration 0 is set for the other serving cell (primary cell), and the first uplink reference UL-DL configuration 2 is set for the serving cell (secondary cell), the second uplink reference UL-DL configuration 1 is set for the secondary cell.

If the serving cell is primary cell, or the serving cell is the secondary cell and the mobile station apparatus 1 is not set to monitor the PDCCH/EPDCCH including the CIF so as to correspond to the serving cell (secondary cell) in the other serving cell (primary cell), the mobile station apparatus sets the first uplink reference UL-DL configuration for the serving cell as the second uplink reference UL-DL configuration for the serving cell (S1106).

The base station apparatus 3 sets the second uplink reference UL-DL configuration on the basis of the setting method illustrated in FIG. 9.

Monitoring the PDCCH/EPDCCH including the CIF indicates trying to decode the PDCCH or the EPDCCH according to a DCI format including the CIF. The CIF is a field to which a carrier indicator is mapped. A value of the carrier indicator indicates a serving cell corresponding to a DCI format to which the carrier indicator is related.

The mobile station apparatus 1 which is set to monitor the PDCCH/EPDCCH including the CIF so as to correspond to the serving cell in the other serving cell monitors the PDCCH/EPDCCH including the CIF in the other serving cell.

The mobile station apparatus 1 which is set to monitor the PDCCH/EPDCCH including the CIF so as to correspond to the serving cell in the other serving cell preferably receives the third information for the serving cell via the PDCCH/EPDCCH.

The mobile station apparatus 1 which is not set to monitor the PDCCH/EPDCCH including the CIF so as to correspond to the serving cell in the other serving cell monitors the PDCCH/EPDCCH including the CIF or not including the CIF in the serving cell.

The mobile station apparatus 1 which is not set to monitor the PDCCH/EPDCCH including the CIF so as to correspond to the serving cell in the other serving cell preferably receives the third information for the serving cell via the PDCCH/EPDCCH.

The PDCCH/EPDCCH for the primary cell is transmitted in the primary cell. The third information for the primary cell is preferably transmitted via the PDCCH/EPDCCH of the primary cell.

The base station apparatus 3 transmits, to the mobile station apparatus 1, a parameter (cif-Presence-r10) indicating whether or not the CIF is included in a DCI format transmitted in the primary cell.

The base station apparatus 3 transmits, to the mobile station apparatus 1, a parameter (CrossCarrierScheduling-Config-r10) related to cross carrier scheduling for each secondary cell.

The parameter (CrossCarrierSchedulingConfig-r10) includes a parameter (schedulingCellInfo-r10) indicating whether (a) PDCCH/EPDCCH corresponding to a related secondary cell is transmitted in the secondary cell or in the other serving cells.

In a case where the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether or not the CIF is included in a DCI format transmitted in the secondary cell.

In a case where the parameter (schedulingCellInfo-r10) indicating that PDCCH/EPDCCH corresponding to a related secondary cell is transmitted in the other serving cells, the parameter (schedulingCellInfo-r10) includes a parameter (schedulingCellId) indicating to which serving cell a downlink assignment for the related secondary cell is sent.

Hereinafter, a description will be made of a method of setting the second downlink reference UL-DL configuration.

In a case where a plurality of serving cells are set for the mobile station apparatus 1, and the first downlink reference UL-DL configurations for at least two serving cells are different from each other, the mobile station apparatus 1 and the base station apparatus 3 set the second downlink reference UL-DL configuration. Except for the case where a plurality of serving cells are set for the mobile station apparatus 1, and the first downlink reference UL-DL configurations for at least two serving cells are different from each other, the mobile station apparatus 1 and the base station apparatus 3 may not set the second downlink reference UL-DL configuration.

A case excluding the case where the first downlink reference UL-DL configurations for at least two serving cells are different from each other is a case where the first downlink reference UL-DL configurations for all the serving cells are the same as each other. In a case where a single serving cell is set for the mobile station apparatus 1, the mobile station apparatus 1 and the base station apparatus 3 may not set the second downlink reference UL-DL configuration.

Figure 11:
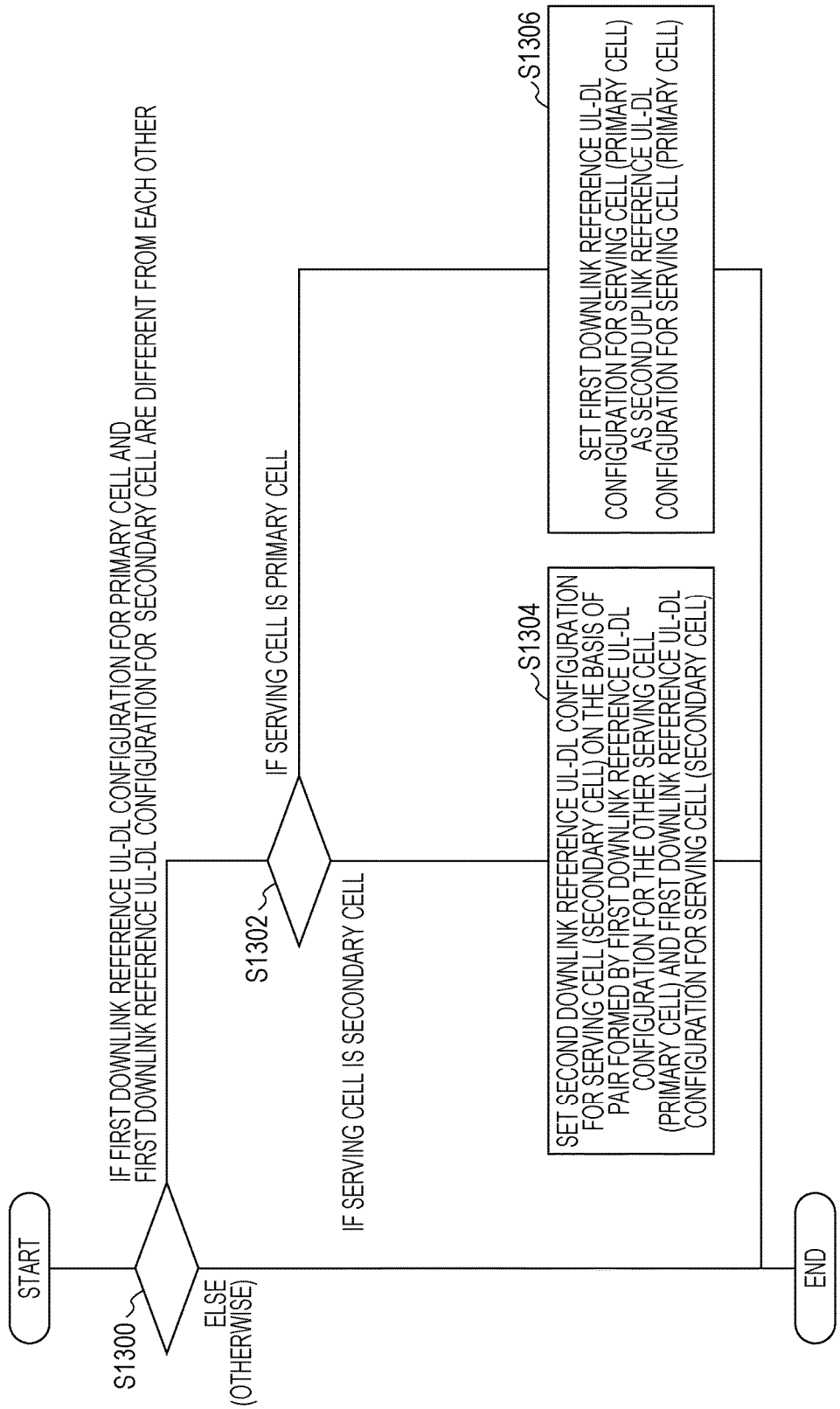
FIG. 11 is a flowchart illustrating a setting method of a second downlink reference UL-DL configuration in the present embodiment.

FIG. 11 is a flowchart illustrating a method of setting the second downlink reference UL-DL configuration in the present embodiment. In FIG. 11, a single primary cell and a single secondary cell are set for the mobile station apparatus 1. The mobile station apparatus 1 performs the setting method illustrated in FIG. 11 on each of the primary cell and the secondary cell.

The mobile station apparatus 1 determines whether or not the first downlink reference UL-DL configuration for the primary cell and the first downlink reference UL-DL configuration for the secondary cell are different from each other (S1300). If the first downlink reference UL-DL configuration for the primary cell and the first downlink reference UL-DL configuration for the secondary cell are the same as each other, the mobile station apparatus 1 does not the second downlink reference UL-DL configuration, and finishes the setting process of the second downlink reference UL-DL configuration.

If the first downlink reference UL-DL configuration for the primary cell and the first downlink reference UL-DL configuration for the secondary cell are different from each other, the mobile station apparatus 1 determines whether a serving cell is the primary cell or the secondary cell (S1302).

If the serving cell is the secondary cell, the mobile station apparatus 1 sets the second uplink reference UL-DL configuration for the serving cell (secondary cell) on the basis of a pair formed by the first downlink reference UL-DL configuration for the other serving cell (primary cell) and the first downlink reference UL-DL configuration for the serving cell (secondary cell) (S1304).

In S1304, the mobile station apparatus 1 sets the second downlink reference UL-DL configuration for the serving cell (secondary cell) on the basis of a table of FIG. 12. FIG. 12 is a diagram illustrating a correspondence between the pair formed by the first downlink reference UL-DL configuration for the primary cell and the first downlink reference UL-DL configuration for the secondary cell, and the second downlink reference UL-DL configuration for the secondary cell.

In FIG. 12, a primary cell UL-DL configuration is set by referring to the first downlink reference UL-DL configuration for the primary cell. In FIG. 12, a secondary cell UL-DL configuration is set by referring to the first downlink reference UL-DL configuration for the secondary cell.

In a case where the pair formed by the first downlink reference UL-DL configuration for the primary cell and the first downlink reference UL-DL configuration for the secondary cell belongs to a set 1 of FIG. 12, the second downlink reference UL-DL configuration for the secondary cell is defined in the set 1.

In a case where the mobile station apparatus 1 is not set to monitor (a) PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 2 of FIG. 12, the second downlink reference UL-DL configuration for the secondary cell is defined in the set 2.

In a case where the mobile station apparatus 1 is not set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 3 of FIG. 12, the second downlink reference UL-DL configuration for the secondary cell is defined in the set 3.

In a case where the mobile station apparatus 1 is set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 4 of FIG. 12, the second downlink reference UL-DL configuration for the secondary cell is defined in the set 4.

In a case where the mobile station apparatus 1 is set to monitor the PDCCH/EPDCCH including the CIF so as to correspond to the secondary cell in the primary cell, and the pair formed by the first downlink reference UL-DL configuration for the primary cell and the first downlink reference UL-DL configuration for the secondary cell belongs to a set 5 of FIG. 12, the second downlink reference UL-DL configuration for the secondary cell is defined in the set 5.

For example, in a case where the first downlink reference UL-DL configuration 1 is set for the primary cell, and the first downlink reference UL-DL configuration 0 is set for the secondary cell, the second downlink reference UL-DL configuration 0 is set for the secondary cell.

If the serving cell is primary cell, the mobile station apparatus sets the first downlink reference UL-DL configuration for the serving cell (primary cell) as the second uplink reference UL-DL configuration for the serving cell (primary cell) (S1306).

In addition, the base station apparatus 3 the second downlink reference UL-DL configuration on the basis of the setting method illustrated in FIG. 11.

Hereinafter, the first uplink reference UL-DL configuration will be described.

The first uplink reference UL-DL configuration is at least used to specify a subframe in which uplink transmission can or not be performed in a serving cell.

The mobile station apparatus 1 does not uplink transmission in a subframe which is indicated as a downlink subframe by the first uplink reference UL-DL configuration. The mobile station apparatus 1 does not uplink transmission in a DwPTS and a GP of a subframe which is indicated as a special subframe by the first uplink reference UL-DL configuration.

Hereinafter, the first downlink reference UL-DL configuration will be described.

The first downlink reference UL-DL configuration is at least used to specify a subframe in which downlink transmission can be performed or cannot be performed in a serving cell.

The mobile station apparatus 1 does not downlink transmission in a subframe which is indicated as an uplink subframe by the first downlink reference UL-DL configuration. The mobile station apparatus 1 does not downlink transmission in a UpPTS and a GP of a subframe which is indicated as a special subframe by the first downlink reference UL-DL configuration.

The mobile station apparatus 1 which sets the first downlink reference UL-DL configuration on the basis of the first information may perform a measurement (for example, a measurement regarding channel state information) using a downlink signal in a downlink subframe or a DwPTS of a special subframe which is indicated by the first uplink reference UL-DL configuration or the first downlink reference UL-DL configuration.

Therefore, in the dynamic TDD, if the base station apparatus 3 uses a subframe which is indicated as a downlink subframe by the first uplink reference UL-DL configuration, as an uplink subframe or a special subframe, or uses a subframe which is indicated as a special subframe by the first uplink reference UL-DL configuration, as an uplink subframe, there is a problem in that the mobile station apparatus 1 in which the first downlink reference UL-DL configuration on the basis of the first information cannot appropriately perform the measurement using a downlink signal.

Thus, the base station apparatus 3 determines a downlink reference UL-DL configuration from a configuration set (configurations of the set) which are restricted on the basis of the first uplink reference UL-DL configuration. In other words, the first downlink reference UL-DL configuration is an element of the configuration set which is restricted on the basis of the first uplink reference UL-DL configuration. The configuration set restricted on the basis of the first uplink reference UL-DL configurations includes uplink reference UL-DL configurations which satisfy the following conditions (a) to (c). FIG. 15 is a diagram relationship between a subframe indicated by the first uplink reference UL-DL configuration and a subframe indicated by the first downlink reference UL-DL configuration. In FIG. 15, D indicates a downlink subframe, U indicates an uplink subframe, and S indicates a special subframe.

Condition (a): a subframe which is indicated as a downlink subframe by the first uplink reference UL-DL configuration is indicated as a downlink subframe.

Condition (b): a subframe which is indicated as an uplink subframe by the first uplink reference UL-DL configuration is indicated as an uplink subframe or a downlink subframe.

Condition (c): a subframe which is indicated as a special subframe by the first uplink reference UL-DL configuration is indicated as a downlink subframe or a special subframe.

Consequently, in the dynamic TDD, since a subframe which is indicated as a downlink subframe by the first uplink reference UL-DL configuration, and a DwPTS of a special subframe are not used for uplink transmission, the mobile station apparatus 1 which sets the first downlink reference UL-DL configuration on the basis of the first information can appropriately perform a measurement using a downlink signal.

In addition, the mobile station apparatus 1 which sets the first downlink reference UL-DL configuration on the basis of the second information may also perform a measurement (for example, a measurement regarding channel state information) using a downlink signal in a downlink subframe or a DwPTS of a special subframe indicated by the first uplink reference UL-DL configuration.

A subframe which is indicated as an uplink subframe by the first uplink reference UL-DL configuration and is indicated as a downlink subframe by the first downlink reference UL-DL configuration is also referred to as a first flexible subframe. The first flexible subframe is a subframe which is reserved for uplink and downlink transmission.

A subframe which is indicated as a special subframe by the first uplink reference UL-DL configuration and is indicated as a downlink subframe by the first downlink reference UL-DL configuration is also referred to as a second flexible subframe. The second flexible subframe is a subframe which is reserved for downlink transmission. The second flexible subframe is a subframe which is reserved for downlink transmission in a DwPTS and uplink transmission in a UpPTS.

Hereinafter, the transmission direction UL-DL configuration will be described in detail.

If the mobile station apparatus 1 determines a transmission direction (up/down) on the basis of the first uplink reference UL-DL configuration, the first downlink reference UL-DL configuration, and scheduling information (a DCI format and/or a HARQ-ACK), there is a problem in that the mobile station apparatus 1 which wrongly receives/decodes the scheduling information (a DCI format and/or a HARQ-ACK) transmits an uplink signal in a subframe in which the base station apparatus 3 transmits a downlink signal to other mobile station apparatuses 1, and thus the uplink signal interferes with the downlink signal.

Therefore, the mobile station apparatus 1 and the base station apparatus 3 of the present invention sets the transmission direction UL-DL configuration regarding a transmission direction (up/down) in a subframe. The transmission direction UL-DL configuration is used to determine a transmission direction in a subframe.

The mobile station apparatus 1 controls transmission in the first flexible subframe and the second flexible subframe on the basis of the scheduling information (a DCI format and/or a HARQ-ACK) and the transmission direction UL-DL configuration.

The base station apparatus 3 transmits the third information indicating the transmission direction UL-DL configuration to the mobile station apparatus 1. The third information is information indicating a subframe in which uplink transmission can be performed. The third information is information indicating a subframe in which downlink transmission can be performed. The third information is information indicating a subframe in which uplink transmission in the UpPTS and downlink transmission in the DwPTS can be performed.

For example, the transmission direction UL-DL configuration is used to specify a transmission direction in a subframe which is indicated as an uplink subframe by the first uplink reference UL-DL configuration and is indicated as a downlink subframe by the first downlink reference UL-DL configuration, and/or a subframe which is indicated as a special subframe by the first uplink reference UL-DL configuration and is indicated as a downlink subframe by the first downlink reference UL-DL configuration. In other words, the transmission direction UL-DL configuration is used to specify a transmission direction in a subframe which is indicated as a subframe different from a subframe which is indicated by the first uplink reference UL-DL configuration and the first downlink reference UL-DL configuration.

FIG. 14 is a diagram illustrating a relationship between a subframe indicated by the first uplink reference UL-DL configuration, a subframe indicated by the first downlink reference UL-DL configuration, and a subframe indicated by the transmission direction UL-DL configuration in the present embodiment. In FIG. 14, D indicates a downlink subframe, U indicates an uplink subframe, and S indicates a special subframe.

The base station apparatus 3 determines the transmission direction UL-DL configuration from a configuration set (configurations of the set) which is restricted on the basis of the first uplink reference UL-DL configuration and the first downlink reference UL-DL configuration. In other words, the transmission direction UL-DL configuration is an element of the configuration set which is restricted on the basis of the first uplink reference UL-DL configuration and the first downlink reference UL-DL configuration. The configuration set which is restricted on the basis of the first uplink reference UL-DL configuration and the first downlink reference UL-DL configuration includes UL-DL configurations which satisfy the following conditions (d) to (h).

Condition (d): a subframe which is indicated as a downlink subframe by the first uplink reference UL-DL configuration and the first downlink reference UL-DL configuration is indicated as a downlink subframe.

Condition (e): a subframe which is indicated as an uplink subframe by the first uplink reference UL-DL configuration and the first downlink reference UL-DL configuration is indicated as an uplink subframe.

Condition (f): a subframe which is indicated as an uplink subframe by the first uplink reference UL-DL configuration but is indicated as a downlink subframe by the first downlink reference UL-DL configuration is indicated as an uplink subframe or a downlink subframe.

Condition (g): a subframe which is indicated as a special subframe by the first uplink reference UL-DL configuration and the first downlink reference UL-DL configuration is indicated as a special subframe.

Condition (h): a subframe which is indicated as a special subframe by the first uplink reference UL-DL configuration but is indicated as a downlink subframe by the first downlink reference UL-DL configuration is indicated as a special subframe or a downlink subframe.

The base station apparatus 3 may perform scheduling of downlink transmission in a subframe which is indicated as a downlink subframe by the transmission direction UL-DL configuration.

The mobile station apparatus 1 may perform a reception process of a downlink signal in a subframe which is indicated as a downlink subframe by the transmission direction UL-DL configuration. The mobile station apparatus 1 may perform monitoring of the PDCCH/EPDCCH in a subframe which is indicated as a downlink subframe by the transmission direction UL-DL configuration. The mobile station apparatus 1 may perform a reception process of a PDSCH in a subframe which is indicated as a downlink subframe by the transmission direction UL-DL configuration on the basis of detection of a downlink grant using the PDCCH/EPDCCH.

In a case where transmission of an uplink signal (PUSCH/SRS) in a subframe indicated as a downlink subframe by the transmission direction UL-DL configuration is scheduled or set, the mobile station apparatus 1 does not perform a transmission process of the uplink signal (PUSCH/SRS) in the subframe.

The base station apparatus 3 may perform scheduling of uplink transmission in a subframe which is indicated as an uplink subframe by the transmission direction UL-DL configuration.

The base station apparatus 3 may perform scheduling of downlink transmission in a subframe which is indicated as an uplink subframe by the transmission direction UL-DL configuration. The base station apparatus 3 may be prohibited from performing scheduling of downlink transmission in a subframe which is indicated as an uplink subframe by the transmission direction UL-DL configuration.

The mobile station apparatus 1 may perform a transmission process of an uplink signal in a subframe which is indicated as an uplink subframe by the transmission direction UL-DL configuration. In a case where transmission of an uplink signal (PUSCH/DMRS/SRS) in a subframe indicated as an uplink subframe by the transmission direction UL-DL configuration is scheduled or set, the mobile station apparatus 1 may perform a transmission process of the uplink signal (PUSCH/DMRS/SRS) in the subframe.

The mobile station apparatus 1 may perform a reception process of a downlink signal in a subframe which is indicated as an uplink subframe by the transmission direction UL-DL configuration and in which uplink transmission is not scheduled. The mobile station apparatus 1 may be prohibited from performing a reception process of a downlink signal in a subframe which is indicated as an uplink subframe by the transmission direction UL-DL configuration.

The base station apparatus 3 performs scheduling of downlink transmission in a DwPTS of subframe which is indicated as a special subframe by the transmission direction UL-DL configuration.

The mobile station apparatus 1 may perform a reception process of a downlink signal in a DwPTS of a subframe which is indicated as a special subframe by the transmission direction UL-DL configuration. The mobile station apparatus 1 may perform monitoring of the PDCCH/EPDCCH in a DwPTS of a subframe which is indicated as a special subframe by the transmission direction UL-DL configuration. The mobile station apparatus 1 may perform a reception process of a PDSCH in a DwPTS of a subframe which is indicated as a special subframe by the transmission direction UL-DL configuration on the basis of detection of a downlink grant using the PDCCH/EPDCCH.

In a case where transmission of a PUSCH in a subframe indicated as a special subframe by the transmission direction UL-DL configuration is scheduled or set, the mobile station apparatus 1 does not perform a transmission process of the PUSCH in the subframe.

In a case where transmission of an SRS in a UpPTS of a subframe indicated as a special subframe by the transmission direction UL-DL configuration is scheduled or set, the mobile station apparatus 1 may perform a transmission process of the SRS in the UpPTS of the subframe.

FIG. 15 is a diagram illustrating a relationship between the first uplink reference UL-DL configuration, the first downlink reference UL-DL configuration, and the transmission direction UL-DL configuration.

For example, in FIG. 15, in a case where the first uplink reference UL-DL configuration is 0, the first downlink reference UL-DL configuration is one of a set {0, 1, 2, 3, 4, 5, 6}. For example, in FIG. 15, in a case where the first uplink reference UL-DL configuration is 1, the first downlink reference UL-DL configuration is one of a set {1, 2, 4, 5}.

For example, in FIG. 15, in a case where the first uplink reference UL-DL configuration is 0, and the first downlink reference UL-DL configuration is 1, the transmission direction UL-DL configuration is one of a set {0, 1, 6}.

In addition, a value of the first downlink reference UL-DL configuration may be the same as a value of the first uplink reference UL-DL configuration. However, in order for the mobile station apparatus 1 which has not received the second information to set the same value as a value of the first uplink reference UL-DL configuration as the first downlink reference UL-DL configuration, a value of the first downlink reference UL-DL configuration indicated by the second information is not preferably the same as a value of the first uplink reference UL-DL configuration indicated by the first information.

In a case where a value of the first uplink reference UL-DL configuration is the same as a value of the first downlink reference UL-DL configuration, the transmission direction UL-DL configuration may not be defined. Alternatively, in a case where a value of the first uplink reference UL-DL configuration is the same as a value of the first downlink reference UL-DL configuration, the same value as the value of the first uplink reference UL-DL configuration and the value of the first downlink reference UL-DL configuration may be set as the transmission direction UL-DL configuration.

In addition, as a configuration set which is restricted on the basis of the first uplink reference UL-DL configuration and the first downlink reference UL-DL configuration, a configuration set (configurations of the set) which is constituted by UL-DL configurations of the first uplink reference UL-DL configuration and UL-DL configurations of the first downlink reference UL-DL configuration may be used.

For example, in a case where the first uplink reference UL-DL configuration is 0, and the first downlink reference UL-DL configuration is 1, a configuration set which is restricted on the basis of the first uplink reference UL-DL configuration and the first downlink reference UL-DL configuration is {0, 1}. In this case, the third information preferably has 1 bit.

The third information may be information indicating the transmission direction UL-DL configuration (configurations of the set) from the configuration set constituted by the first uplink reference UL-DL configuration and the first downlink reference UL-DL configuration.

Hereinafter, the first uplink reference UL-DL configuration and the second uplink reference UL-DL configuration will be described in detail.

The first uplink reference UL-DL configuration and the second uplink reference UL-DL configuration are used to specify (select, determine) a correspondence between a subframe n in which the PDCCH/EPDCCH/PHICH is allocated and a subframe n+k in which the PUSCH corresponding to the PDCCH/EPDCCH/PHICH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to determine a correspondence between a subframe in which the PDCCH/EPDCCH/PHICH is allocated and a subframe in which the PUSCH corresponding to the PDCCH/EPDCCH/PHICH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding second uplink reference UL-DL configuration is used to determine a correspondence between a subframe in which the PDCCH/EPDCCH/PHICH is allocated and a subframe in which the PUSCH corresponding to the PDCCH/EPDCCH/PHICH is allocated in each of the two serving cells.

FIG. 16 is a diagram illustrating a correspondence between the subframe n in which the PDCCH/EPDCCH/PHICH is allocated and the PUSCH corresponding to the PDCCH/EPDCCH/PHICH is allocated in the present embodiment. The mobile station apparatus 1 specifies (selects, determines) a value of k on the basis of a table of FIG. 16.

In FIG. 16, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 16, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 16, the first uplink reference UL-DL configuration and the second uplink reference UL-DL configuration are simply referred to as an uplink-downlink configuration.

In a case where the mobile station apparatus 1 detects the PDCCH/EPDCCH and including an uplink grant which corresponds to a serving cell for which uplink-downlink configurations of 1 to 6 and targets the mobile station apparatus 1 in the subframe n, the PUSCH corresponding to the uplink grant is transmitted in the subframe n+k which is specified (selected, determined) on the basis of the table of FIG. 16.

In a case where the mobile station apparatus 1 detects the PHICH including a NACK which corresponds to a serving cell for which uplink-downlink configurations of 1 to 6 and targets the mobile station apparatus 1 in the subframe n, the PUSCH corresponding to the uplink grant is transmitted in the subframe n+k which is specified (selected, determined) on the basis of the table of FIG. 16.

An uplink grant which corresponds to a serving cell for which the uplink-downlink configuration 0 is set and targets the mobile station apparatus 1 includes a 2-bit uplink index (UL index). An uplink grant corresponds to a serving cell for which the uplink-downlink configurations 1 to 5 are set and targets the mobile station apparatus 1 does not include the uplink index (UL index).

In a case where 1 is set to a most significant bit (MSB) of an uplink index included in the uplink grant corresponding to a serving cell for which the uplink-downlink configuration 0 is set in the subframe n, the mobile station apparatus 1 adjusts transmission of the PUSCH corresponding to the uplink grant in the subframe n+k which is specified (selected, determined) on the basis of the table of FIG. 16.

In a case where the mobile station apparatus 1 receives a PHICH including the NACK corresponding to a serving cell for which the uplink-downlink configuration 0 is set in a first resource set of the subframe n=0 or 5, the mobile station apparatus 1 adjusts transmission of the PUSCH corresponding to the PHICH in the subframe n+k which is specified (selected, determined) on the basis of the table of FIG. 16.

In a case where 1 is set to a least significant bit (LSB) of an uplink index included in the uplink grant corresponding to a serving cell for which the uplink-downlink configuration 0 is set in the subframe n, the mobile station apparatus 1 adjusts transmission of the PUSCH corresponding to the uplink grant in the subframe n+7.

In a case where the mobile station apparatus 1 receives a PHICH including the NACK corresponding to a serving cell for which the uplink-downlink configuration 0 is set in a second resource set of the subframe n=0 or 5, the mobile station apparatus 1 adjusts transmission of the PUSCH corresponding to the uplink grant in the subframe n+7.

In a case where the mobile station apparatus 1 receives a PHICH including the NACK corresponding to a serving cell for which the uplink-downlink configuration 0 is set in the subframe n=1 or 5, the mobile station apparatus 1 adjusts transmission of the PUSCH corresponding to the uplink grant in the subframe n+7.

For example, in a case where the mobile station apparatus 1 detects a PDCCH, an EPDCCH, or a PHICH corresponding to a serving cell for which the uplink-downlink configuration 0 is set in [SFN=m, subframe 1], the mobile station apparatus adjusts transmission of the PUSCH in [SFN=m, subframe 7] which is six subframes later than the subframe.

The first uplink reference UL-DL configuration and the second uplink reference UL-DL configuration are used to specify (select, determine) a correspondence between the subframe n in which the PHICH is allocated and the subframe n−k in which the PUSCH corresponding to the PHICH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to specify (select, determine) a correspondence between the subframe n in which the PHICH is allocated and the subframe n−k in which the PUSCH corresponding to the PHICH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding first uplink reference UL-DL configuration is used to specify (select, determine) a correspondence between the subframe n in which the PHICH is allocated and the subframe n−k in which the PUSCH corresponding to the PHICH is allocated in each of the two serving cells.

FIG. 17 is a diagram illustrating a correspondence between the subframe n in which the PHICH is allocated and the subframe n−k in which the PUSCH corresponding to the PHICH is allocated in the present embodiment. The mobile station apparatus 1 specifies (selects, determines) a value of k on the basis of a table of FIG. 17.

In FIG. 17, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 17, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 17, the first uplink reference UL-DL configuration and the second uplink reference UL-DL configuration are simply referred to as an uplink-downlink configuration.

Regarding a serving cell for the uplink-downlink configurations 1 to 6 are set, a HARQ indicator (HARQ-ACK) which is received via a PHICH corresponding to the serving cell in the subframe n is related to transmission of a PUSCH in the subframe n−k which is specified on the basis of the table of FIG. 17.

Regarding a serving cell for the uplink-downlink configuration 0 is set, a HARQ indicator (HARQ-ACK) which is received via a PHICH corresponding to the serving cell in a first resource set of the subframe n=0 or 5, or in the subframes n=1 or 6, is related to transmission of a PUSCH in the subframe n−k which is specified on the basis of the table of FIG. 17.

Regarding a serving cell for the uplink-downlink configuration 0 is set, a HARQ indicator (HARQ-ACK) which is received via a PHICH corresponding to the serving cell in a second resource set of the subframe n=0 or 5 is related to transmission of a PUSCH in the subframe n−6.

For example, regarding a serving cell for which the uplink-downlink configuration 1 is set, a HARQ indicator (HARQ-ACK) which is received via the PHICH in [SFN=m, subframe 1] is related to transmission of the PUSCH in [SFN=m−1, subframe 7] which is four subframes earlier than the subframe.

The first uplink reference UL-DL configuration and the second uplink reference UL-DL configuration are used to specify (select, determine) a correspondence between the subframe n in which a PUSCH is allocated and the subframe n+k in which a PHICH corresponding to the PUSCH is allocated.

In a case where a single primary cell is set, or in a case where a single primary cell and a single secondary cell are set, and the first uplink reference UL-DL configuration for the primary cell is the same as the first uplink reference UL-DL configuration for the secondary cell, a corresponding first uplink reference UL-DL configuration is used to specify (select, determine) a correspondence between the subframe n in which the PUSCH is allocated and the subframe n+k in which the PHICH corresponding to the PUSCH is allocated in each of the two serving cells.

In a case where a single primary cell and a single secondary cell are set, and the first uplink reference UL-DL configuration for the primary cell is different from the first uplink reference UL-DL configuration for the secondary cell, a corresponding second uplink reference UL-DL configuration is used to specify (select, determine) a correspondence between the subframe n in which the PUSCH is allocated and the subframe n+k in which the PHICH corresponding to the PUSCH is allocated in each of the two serving cells.

FIG. 18 is a diagram illustrating a correspondence between the subframe n in which the PUSCH is allocated and the subframe n+k in which the PHICH corresponding to the PUSCH is allocated in the present embodiment. The mobile station apparatus 1 specifies (selects, determines) a value of k on the basis of a table of FIG. 18.

In FIG. 18, in a case where a single primary cell is set, or in a case where a single primary cell and a single secondary cell are set, and the first uplink reference UL-DL configuration for the primary cell is the same as the first uplink reference UL-DL configuration for the secondary cell, an uplink-downlink configuration is set by referring to the first uplink reference UL-DL configuration.

In FIG. 18, in a case where a single primary cell and a single secondary cell are set, and the first uplink reference UL-DL configuration for the primary cell is different from the first uplink reference UL-DL configuration for the secondary cell, an uplink-downlink configuration is set by referring to the second uplink reference UL-DL configuration.

Hereinafter, in description of FIG. 18, the first uplink reference UL-DL configuration and the second uplink reference UL-DL configuration are simply referred to as an uplink-downlink configuration.

In a case where transmission of the PUSCH is scheduled in the subframe n, the mobile station apparatus 1 determines a PHICH resource in the subframe n+k which is specified on the basis of the table of FIG. 18.

For example, regarding a serving cell for which the uplink-downlink configuration 0 is set, in a case where transmission of the PUSCH is scheduled in [SFN=m, subframe n=2], a PHICH resource is determined in [SFN=m, subframe n=6].

For example, regarding a serving cell for which the uplink-downlink configuration 0 is set, in a case where transmission of the PUSCH is scheduled in [SFN=m, subframe n=3], a PHICH resource is determined from a first resource set in [SFN=m+1, subframe n=0].

For example, regarding a serving cell for which the uplink-downlink configuration 0 is set, in a case where transmission of the PUSCH is scheduled in [SFN=m, subframe n=4], a PHICH resource is determined from a second resource set in [SFN=m+1, subframe n=0].

For example, regarding a serving cell for which the uplink-downlink configuration 0 is set, in a case where transmission of the PUSCH is scheduled in [SFN=m, subframe n=7], a PHICH resource is determined in [SFN=m+1, subframe n=1].

For example, regarding a serving cell for which the uplink-downlink configuration 0 is set, in a case where transmission of the PUSCH is scheduled in [SFN=m, subframe n=8], a PHICH resource is determined from a first resource set in [SFN=m+1, subframe n=5].

For example, regarding a serving cell for which the uplink-downlink configuration 0 is set, in a case where transmission of the PUSCH is scheduled in [SFN=m, subframe n=9], a PHICH resource is determined from a second resource set in [SFN=m+1, subframe n=5].

Hereinafter, the first downlink reference UL-DL configuration and the second downlink reference UL-DL configuration will be described in detail.

The first downlink reference UL-DL configuration and the second downlink reference UL-DL configuration are used to specify (select, determine) a correspondence between the subframe n in which a PDSCH is allocated and the subframe n+k in which a HARQ-ACK corresponding to the PDSCH is transmitted.

In a case where a single primary cell is set, or in a case where a single primary cell and a single secondary cell are set, and the first downlink reference UL-DL configuration for the primary cell is the same as the first downlink reference UL-DL configuration for the secondary cell, a corresponding first downlink reference UL-DL configuration is used to specify (select, determine) a correspondence between the subframe n in which the PDSCH is allocated and the subframe n+k in which a HARQ-ACK corresponding to the PDSCH is transmitted in each of the two serving cells.

In a case where a single primary cell and a single secondary cell are set, and the first downlink reference UL-DL configuration for the primary cell is different from the first downlink reference UL-DL configuration for the secondary cell, a corresponding second downlink reference UL-DL configuration is used to specify (select, determine) a correspondence between the subframe n in which the PDSCH is allocated and the subframe n+k in which a HARQ-ACK corresponding to the PDSCH is transmitted in each of the two serving cells.

FIG. 19 is a diagram illustrating a correspondence between the subframe n+k in which the PDSCH is allocated and the subframe n in which a HARQ-ACK corresponding to the PDSCH is transmitted in each of the two serving cells. The mobile station apparatus 1 specifies (selects, determines) a value of k on the basis of a table of FIG. 19.

In FIG. 19, in a case where a single primary cell is set, or in a case where a single primary cell and a single secondary cell are set, and the first downlink reference UL-DL configuration for the primary cell is the same as the first downlink reference UL-DL configuration for the secondary cell, an uplink-downlink configuration is set by referring to the first downlink reference UL-DL configuration.

In FIG. 19, in a case where a single primary cell is set, or in a case where a single primary cell and a single secondary cell are set, and the first downlink reference UL-DL configuration for the primary cell is the same as the first downlink reference UL-DL configuration for the secondary cell, an uplink-downlink configuration is set by referring to the second downlink reference UL-DL configuration.

Hereinafter, in description of FIG. 19, the first downlink reference UL-DL configuration and the second downlink reference UL-DL configuration are simply referred to as an uplink-downlink configuration.

In a case where the mobile station apparatus 1 detects transmission of the PDSCH in which transmission of a corresponding HARQ-ACK targeting the mobile station apparatus 1 is to be transmitted in a subframe n−k (k is specified on the basis of the table of FIG. 19) for a serving cell, the HARQ-ACK is transmitted in the subframe n.

For example, the mobile station apparatus 1 does not make a response of the HARQ-ACK to transmission of the PDSCH which is used to transmit system information. For example, the mobile station apparatus 1 makes a response of the HARQ-ACK to transmission of the PDSCH which is scheduled by a DCI format including the CRC scrambled with the C-RNTI.

For example, the mobile station apparatus 1 performs transmission of the HARQ-ACK of the PDSCH received in the subframe n−6 and/or n−7 for a serving cell for which the uplink-downlink configuration 1 is set, in the subframe n=2.

In addition, in a case where the first uplink reference UL-DL configuration is set, and the first downlink reference UL-DL configuration and the transmission direction UL-DL configuration are not set, the mobile station apparatus 1 may specify (select, determine) a transmission direction (up/down) on the basis of the first uplink reference UL-DL configuration.

Further, in a case where the first uplink reference UL-DL configuration and the first downlink reference UL-DL configuration are set, and the transmission direction UL-DL configuration is not set, the mobile station apparatus 1 may specify (select, determine) a transmission direction (up/down) on the basis of the first downlink reference UL-DL configuration.

Further, the first downlink reference UL-DL configuration may not be defined for a serving cell which has not received the second information. In this case, the mobile station apparatus 1 and the base station apparatus 3 may perform the above-described process performed on the basis of the first downlink reference UL-DL configuration, on the basis of the first uplink reference UL-DL configuration (serving cell UL-DL configuration). A serving cell which has not received the second information is a serving cell for which the dynamic TDD is not set.

For example, in a case where a single primary cell and a single secondary cell are set; the second information for the primary cell has not been received; the second information for the secondary cell has been received; the first uplink reference UL-DL configuration (serving cell UL-DL configuration) for the primary cell is different from the first downlink reference UL-DL configuration for the secondary cell; and a serving cell is the secondary cell, the second downlink reference UL-DL configuration may be set on the basis of a pair formed by the first uplink reference UL-DL configuration for the other serving cell (primary cell) and the first downlink reference UL-DL configuration for the serving cell (secondary cell).

For example, in a case where a single primary cell and a single secondary cell are set; the second information for the primary cell has not been received; the second information for the secondary cell has been received; the first uplink reference UL-DL configuration (serving cell UL-DL configuration) for the primary cell is different from the first downlink reference UL-DL configuration for the secondary cell; and a serving cell is the secondary cell, a corresponding second downlink reference UL-DL configuration may be used to specify (select, determine) a correspondence between the subframe n in which the PDSCH is allocated and the subframe n+k in which a HARQ-ACK corresponding to the PDSCH is transmitted in each of the two serving cells.

For example, in a case where a single primary cell and a single secondary cell are set; the second information for the primary cell has not been received; the second information for the secondary cell has been received; and the first uplink reference UL-DL configuration (serving cell UL-DL configuration) for the primary cell is the same as the first downlink reference UL-DL configuration for the secondary cell, a corresponding first uplink reference UL-DL configuration may be used to specify (select, determine) a correspondence between the subframe n in which the PDSCH is allocated and the subframe n+k in which a HARQ-ACK corresponding to the PDSCH is transmitted in the primary cell, and a corresponding first downlink reference UL-DL configuration may be used to specify (select, determine) a correspondence between the subframe n in which the PDSCH is allocated and the subframe n+k in which a HARQ-ACK corresponding to the PDSCH is transmitted in the secondary cell.

For example, in a case where a single primary cell and a single secondary cell are set; the second information for the primary cell has not been received; the second information for the secondary cell has been received; and the first uplink reference UL-DL configuration (serving cell UL-DL configuration) for the primary cell is different from the first downlink reference UL-DL configuration for the secondary cell, a primary cell UL-DL configuration is set by referring to the first uplink reference UL-DL configuration for the primary cell in FIGS. 10 and 12.

Hereinafter, CSI reporting of the present invention will be described.

As described above, a downlink reference signal is used to measure channel state information (CSI) of a downlink. Particularly, the NZP CSI-RS is used for the mobile station apparatus 1 to calculate channel state information of a downlink. In addition, a resource of the ZP CSI-RS is set by the base station apparatus 3. The base station apparatus 3 transmits the ZP CSI-RS with zero output, and, for example, the mobile station apparatus 1 can measure interference with a resource corresponding to the NZP CSI-RS in a certain cell. The mobile station apparatus 1 computes the NZP CSI-RS and a channel quality indicator (CQI) included in the CSI by the NZP CSI-RS. Further, an index of the CQI corresponds to a modulation method and a transport block size of a PDSCH. The mobile station apparatus 1 calculates an index of the CQI corresponding to a combination which causes an error rate of the transport block not to exceed a predetermined value (for example, 0.1). The CSI may include a rank indicator (RI), a precoding matrix indicator (PMI), or a precoding type indicator (PTI). The measured and calculated CSI is reported to the base station apparatus 3 through periodic CSI reporting or aperiodic CSI reporting by using a PUCCH or a PUSCH.

Hereinafter, a description will be made of a reporting method in a case where a periodic CSI is used in the present invention.

In a case where simultaneous transmission of a PUSCH and a PUCCH is not set, the periodic CSI is transmitted by using the PUCCH in a subframe to which the PUSCH is not assigned.

In a case where the simultaneous transmission of the PUSCH and the PUCCH is not set, the periodic CSI is transmitted in a subframe to which the PUSCH is assigned, by using the PUSCH of a serving cell in which a given parameter ServeCellIndex of a high layer is the smallest value.

The periodic CSI is transmitted with a system frame number and a slot number satisfying the following Equation 1.

$$(10 \times n_f + \lfloor n_s/2 \rfloor - N_{OFFSET,CQI}) \bmod (N_{pd}) = 0 \quad [\text{Math 1}]$$

Here, $n_f$ indicates a system frame number, and $n_s$ indicates a slot number in a system frame. In addition, $N_{OFFSET,CQI}$ indicates a timing offset, and $N_{pd}$ indicates the reporting periodicity of the periodic CSI, both of which are respectively set through signaling by a high layer on the basis of a table illustrated in FIG. 20 in the TDD. In FIG. 20, $I_{CQI/PMI}$ is a parameter of which a notification is sent by a high layer, and the mobile station apparatus 1 having received the notification of the parameter specifies (selects, determines) a periodicity $N_{pd}$ and a timing offset $N_{OFFSET,CQI}$ of the periodic CSI by using the table of FIG. 20. As an example, in the case where $I_{CQI/PMI}$ of which a notification is sent by a high layer is 3, it can be seen from the table of FIG. 20 that periodicity $N_{pd}$ is 5, and $N_{OFFSET,CQI}$ is 2. Therefore, if these values are assigned to Equation 1, it is possible to specify that the periodic CSI is transmitted with a system frame number and a slot number satisfying the following Equation 2.

$$(10 \times n_f + \lfloor n_s/2 \rfloor - 2) \bmod 5 = 0 \quad \text{[Math 2]}$$

Figure 21:
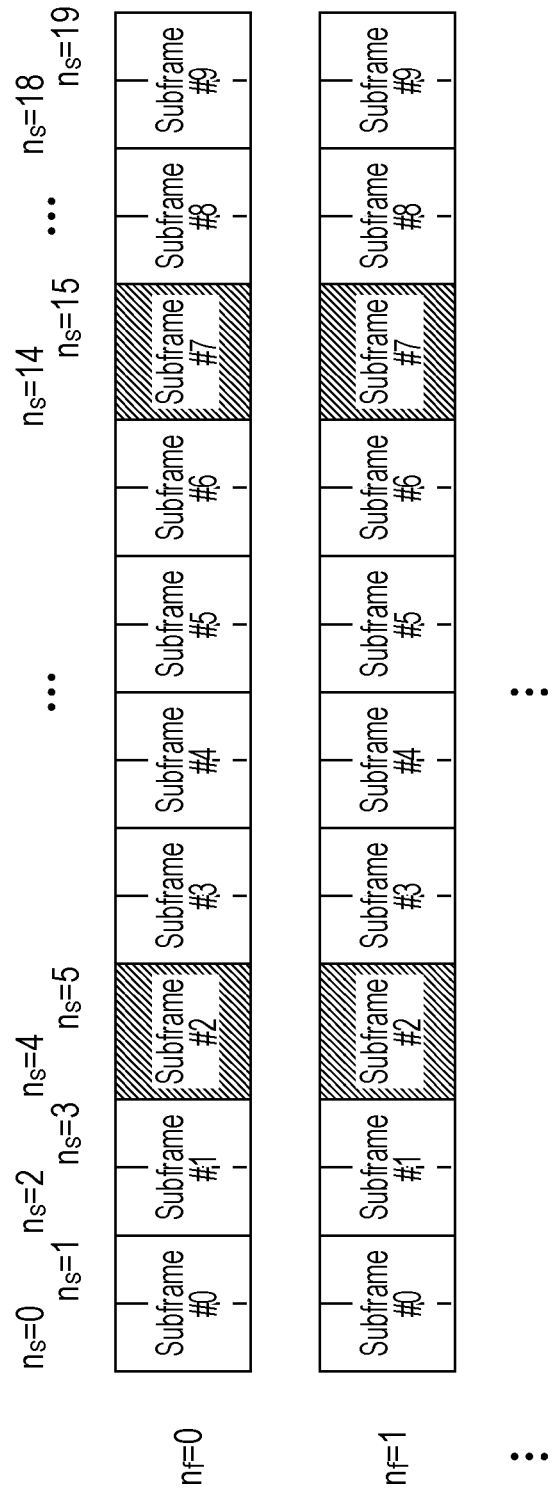
FIG. 21 is a diagram illustrating an example of a subframe in which a periodic CSI is transmitted in the present embodiment.

Therefore, as illustrated in FIG. 21, the periodic CSI is transmitted in fifth and sixth ($n_s$=4 and 5) slots (the subframe #2) and fifteenth and sixteenth ($n_s$=14 and 15) slots (the subframe #7) of each system frame.

The periodic CSI is transmitted as a UL signal in the designated subframes via a PUCCH or a PUSCH, but in a case where the transmitted periodic CSI and a DL signal for any mobile station apparatus are transmitted in the same subframe, the two signals interfere with each other, and this causes deterioration in each signal. Therefore, in the present embodiment, a periodicity for transmitting the periodic CSI is restricted by using the first downlink reference UL-DL configuration.

Hereinafter, a description will be made of a case where the periodicity for transmitting the periodic CSI is determined on the basis of the first downlink reference UL-DL configuration. FIG. 22 illustrates configurations of a downlink subframe, a special subframe, and an uplink subframe, and supported reporting periodicities of the periodic CSI in the configurations in the first downlink reference UL-DL configuration. In the present embodiment, the mobile station apparatus 1 can report the periodic CSI only in the uplink subframe hatched in FIG. 22. For this reason, for example, in a case where the first downlink reference UL-DL configuration is 2, an uplink subframe is present every five subframes, and thus a supported reporting periodicity of the periodic CSI is 5 ms or more, and a reporting periodicity of 1 ms is not necessary. Similarly, in a case where the first downlink reference UL-DL configuration is 3, an uplink subframe is present after one or two subframes, but a downlink subframe is necessary to be present after five subframes, and thus a reporting periodicity of 5 ms is not necessary. Thus, a periodicity for transmitting the periodic CSI is restricted as follows on the basis of the first downlink reference UL-DL configuration.

(1) The periodic CSI reporting periodicity $N_{pd}$=1 is applicable only if the first downlink reference UL-DL configuration belongs to 0, 1, 3, 4 and 6, and the periodic CSI is transmitted in a case where a subframe is an uplink subframe indicated by the first downlink reference UL-DL configuration.

(2) The periodic CSI reporting periodicity $N_{pd}$=5 is applicable only if the first downlink reference UL-DL configuration belongs to 0, 1, 2 and 6. However, in a case where the first downlink reference UL-DL configuration is 6, the reporting periodicity may be applicable only when the timing offset $N_{OFFSET,CQI}$ is 2 or 3.

(3) The periodic CSI reporting periodicity $N_{pd}$=10, 20, 40, 80, and 160 are applicable for all of the first downlink reference UL-DL configurations.

In addition, even a periodicity supported on the basis of the first downlink reference UL-DL configuration may be excluded in a case where a subframe designated by the timing offset $N_{OFFSET,CQI}$ is a downlink subframe indicated by the first downlink reference UL-DL configuration at all times. For example, it is assumed that the periodic CSI reporting periodicity of 5 ms is designated in a case where the first downlink reference UL-DL configuration is 0. In this case, if the timing offset 0 is designated, corresponding subframes (the subframes #0 and #5) are downlink subframes indicated by the first downlink reference UL-DL configuration at all times, and thus the periodic CSI which is an uplink signal cannot be transmitted. In the same manner for a case of the timing offset 1, corresponding subframes (the subframes #1 and #6) are special subframes indicated by the first downlink reference UL-DL configuration at all times, and thus the periodic CSI cannot be transmitted at all times in a case where the periodic CSI cannot be transmitted in the special subframe indicated by the first downlink reference UL-DL configuration. Therefore, in a case where the first downlink reference UL-DL configuration is 0, the timing offset $N_{OFFSET,CQI}$ is preferably selected from among 2, 3, and 4, and is set.

As described above, in the present invention, the base station apparatus 3 restricts a reporting periodicity and/or a timing offset of the periodic CSI which is reported by the mobile station apparatus 1 on the basis of the first downlink reference UL-DL configuration of which a notification is sent to the mobile station apparatus 1.

In addition, the mobile station apparatus 1 restricts an applicable reporting periodicity and/or a timing offset of the periodic CSI on the basis of the first downlink reference UL-DL configuration of which a notification is sent from the base station apparatus 3. The mobile station apparatus 1 may perform predetermined error handling in a case where a reporting periodicity and/or a timing offset of which a notification is sent via a high layer is not an applicable value/are not applicable values. Further, the predetermined error handling may be performed in the high layer.

As an example of the predetermined error handling, in a case where a reporting periodicity and/or a timing offset of the periodic CSI, of which a notification is sent, are (is) not an applicable value, the mobile station apparatus 1 discards the value.

As another example of the predetermined error handling, in a case where a reporting periodicity and/or a timing offset of the periodic CSI, of which a notification is sent, is not an applicable value, the mobile station apparatus 1 requests the base station apparatus 3 to transmit a reporting periodicity and/or a timing offset of the periodic CSI again.

As another example of the predetermined error handling, in a case where a reporting periodicity and/or a timing offset of the periodic CSI, of which a notification is sent, is not an applicable value, the mobile station apparatus 1 selects and uses a value from among applicable values according to a predetermined rule.

As mentioned above, a description has been made of a case where a periodicity and/or a timing off for transmitting the periodic CSI are (is) restricted on the basis of the first downlink reference UL-DL configuration, but the method is also effective in a case where a plurality of serving cells are set for the mobile station apparatus 1. In this case, UE restricts a periodicity and/or a timing offset for transmitting the periodic CSI on the basis of the first downlink reference UL-DL configuration for a primary cell.

Figure 23:
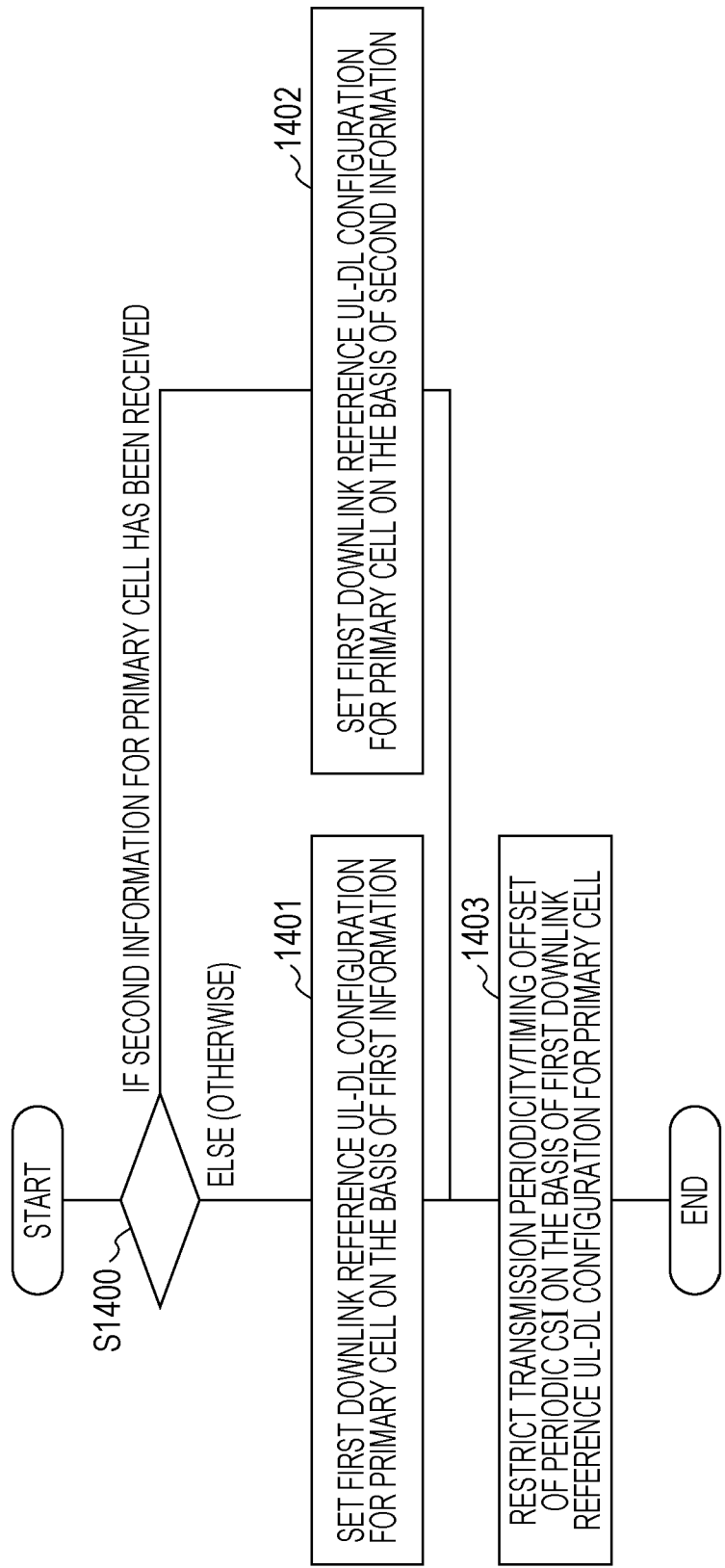
FIG. 23 is a flowchart illustrating an example of a process of restricting (a) periodic CSI reporting periodicity/timing offset on the basis of the first downlink reference UL-DL configuration in the present embodiment.

In addition, in a case where the second information has been received, the mobile station apparatus 1 restricts a periodicity and/or a timing for transmitting the periodic CSI on the basis of the first downlink reference UL-DL configuration which is set on the basis of the second information. In a case where the second information has not been received, the mobile station apparatus 1 restricts a periodicity and/or a timing offset for transmitting the periodic CSI on the basis of the first downlink reference UL-DL configuration which is set on the basis of the first information. This will be described in detail with reference to a flowchart illustrated in FIG. 23. The mobile station apparatus 1 determines whether or not the second information for a primary cell has been received (S1400). If the second information for the primary cell has been received, the mobile station apparatus 1 sets the first downlink reference UL-DL configuration for the primary cell on the basis of the second information for the primary cell (S1401). If the second information for the primary cell has not been received (else/otherwise), the mobile station apparatus 1 sets the first downlink reference UL-DL configuration for the primary cell on the basis of the first information for the primary cell (S1402). The mobile station apparatus 1 restricts a reporting periodicity and/or a timing offset of the periodic CSI on the basis of the first downlink reference UL-DL configuration for the primary cell which is set in S1401 or S1402 (S1403).

However, the method is described on the premise that the mobile station apparatus 1 transmits the periodic CSI via the PUCCH only in a primary cell, but another method is employed in a case where the mobile station apparatus 1 transmits the periodic CSI via the PUCCH in a secondary cell. For example, the mobile station apparatus 1 may receive the second information for a secondary cell, set the first downlink reference UL-DL configuration for the secondary cell on the basis of the second information, and restrict a reporting periodicity and/or a timing offset of the periodic CSI which is transmitted via the PUCCH of the secondary cell on the basis of the first downlink reference UL-DL configuration for the secondary cell. For example, the mobile station apparatus 1 may restrict a reporting periodicity and/or a timing offset of the periodic CSI which is transmitted via the PUCCH of the primary cell and/or the secondary cell on the basis of the first downlink reference UL-DL configuration for the primary cell and the first downlink reference UL-DL configuration for the secondary cell.

Figure 24:
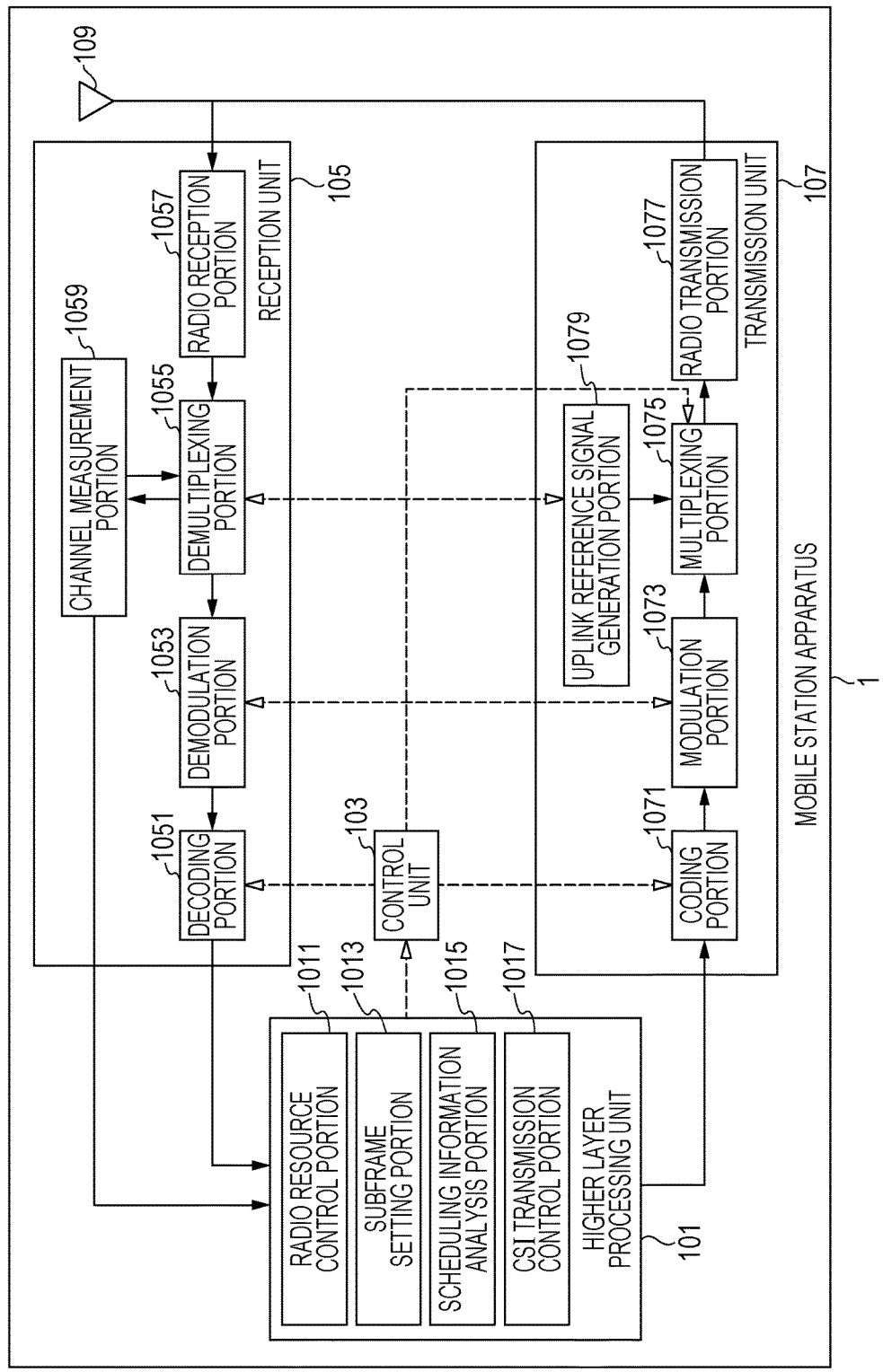
FIG. 24 is a schematic block diagram illustrating a configuration of a mobile station apparatus 1 of the present embodiment.

FIG. 24 is a schematic block diagram illustrating a configuration of the mobile station apparatus 1 according to the present embodiment. As illustrated in FIG. 7, the mobile station apparatus 1 includes a higher layer processing unit 101, a control unit 103, a reception unit 105, a transmission unit 107, and a transmit and receive antenna 109. In addition, the higher layer processing unit 101 includes a radio resource control portion 1011, a subframe setting portion 1013, a scheduling information analysis portion 1015, and a CSI transmission control portion 1017. Further, the reception unit 105 includes a decoding portion 1051, a demodulation portion 1053, a demultiplexing portion 1055, a radio reception portion 1057, and a channel measurement portion 1059. Furthermore, the transmission unit 107 includes a coding portion 1071, a modulation portion 1073, a multiplexing portion 1075, a radio transmission portion 1077, and an uplink reference signal generation portion 1079.

The higher layer processing unit 101 outputs uplink data (transport block) which is generated according to a user's operation or the like, to the transmission unit 107. In addition, the higher layer processing unit 101 performs processes on a medium access control (MAC) layer, a packet data convergence protocol (PDCP) layer, a radio link control (RLC) layer, and a radio resource control (RRC) layer.

The radio resource control portion 1011 of the higher layer processing unit 101 manages various items for setting information of the terminal. In addition, the radio resource control portion 1011 generates information which is to be mapped in each channel of an uplink, and outputs the information to the transmission unit 107.

The subframe setting portion 1013 of the higher layer processing unit 101 manages a first uplink reference UL-DL configuration (uplink reference configuration), a first downlink reference UL-DL configuration (downlink reference configuration), a second uplink reference UL-DL configuration, a second downlink reference UL-DL configuration, and a transmission direction UL-DL configuration (transmission direction configuration).

The subframe setting portion 1013 sets the first uplink reference UL-DL configuration, the first downlink reference UL-DL configuration, the second uplink reference UL-DL configuration, the second downlink reference UL-DL configuration, and the transmission direction UL-DL configuration.

The scheduling information analysis portion 1015 of the higher layer processing unit 101 analyzes a DCI format (scheduling information) which is received via the reception unit 105, generates control information for controlling the reception unit 105 and the transmission unit 107 on the basis of a result of analyzing the DCI format, and outputs the control information to the control unit 103.

The scheduling information analysis portion 1015 also determines timings for performing a transmission process and a reception process on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI transmission control portion 1017 reads a parameter indicating a reporting periodicity and/or a timing offset of the periodic CSI from RRC parameters of which a notification is sent from the base station apparatus 3 via an RRC layer, and specifies (selects, determines) a subframe in which the periodic CSI is transmitted.

The CSI transmission control portion 1017 restricts a subframe used to transmit the periodic CSI on the basis of the first downlink reference UL-DL configuration which is set by the subframe setting portion 1013. For example, in a case where a reporting periodicity and/or a timing offset of the periodic CSI, set by the RRC parameter, cannot be used in the set first downlink reference UL-DL configuration, the CSI transmission control portion 1017 performs the above-described error handling.

The CSI transmission control portion 1017 inserts channel state information measured by the channel measurement portion 1059 into a PUCCH or a PUSCH in a subframe in which the periodic CSI is transmitted, and outputs the PUCCH or the PUSCH to the transmission unit 107.

The control unit 103 generates control signals for controlling the reception unit 105 and the transmission unit 107 on the basis of the control information from the higher layer processing unit 101. The control unit 103 outputs the generated control signals to the reception unit 105 and the transmission unit 107 so as to control the reception unit 105 and the transmission unit 107.

The reception unit 105 demultiplexes, demodulates and decodes a received signal which is received from the base station apparatus 3 via the transmit and receive antenna 109, in response to the control signal which is input from the control unit 103, and outputs the decoded information to the higher layer processing unit 101.

The radio reception portion 1057 converts (down-converts) a downlink signal which is received via the transmit and receive antenna 109 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal. The radio reception portion 1057 removes a portion corresponding to a guard interval (GI) from the converted digital signal, and performs fast Fourier transform (FFT) on the signal from which the guard interval is removed, so as to extract a signal of the frequency domain.

The demultiplexing portion 1055 demultiplexes the extracted signal into the PHICH, the PDCCH, the EPDCCH, the PDSCH, and the downlink reference signal. Further, the demultiplexing portion 1055 compensates for channels such as the PHICH, the PDCCH, the EPDCCH, and the PDSCH on the basis of channel estimation values which are input from the channel measurement portion 1059. Furthermore, the demultiplexing portion 1055 outputs the demultiplexed downlink reference signal to the channel measurement portion 1059.

The demodulation portion 1053 multiplies and combines the PHICH by and with a corresponding sign, demodulates the combined signal in a binary phase shift keying (BPSK) modulation method, and outputs an obtained signal to the decoding portion 1051. The decoding portion 1051 decodes the PHICH directed to the mobile station apparatus, and outputs a decoded HARQ indicator to the higher layer processing unit 101. The demodulation portion 1053 demodulates the PDCCH and/or the EPDCCH in a QPSK modulation method, and outputs an obtained result to the decoding portion 1051. In a case where the decoding portion 1051 tries to decode the PDCCH and/or the EPDCCH and succeeds in the decoding, and the decoding portion outputs decoded downlink control information and RNTI corresponding to the downlink control information to the higher layer processing unit 101.

The demodulation portion 1053 demodulates the PDSCH using a modulation method such as quadrature phase shift keying (QPSK), 16 quadrature amplitude modulation (QAM), or 64 QAM, of which a notification is sent in a downlink grant, and outputs an obtained result to the decoding portion 1051. The decoding portion 1051 performs decoding on the basis of information regarding a coding rate of which a notification has been sent with the downlink control information, and outputs decoded downlink data (transport block) to the higher layer processing unit 101.

The channel measurement portion 1059 measures path loss of a downlink or a channel state on the basis of the downlink reference signal which is input from the demultiplexing portion 1055, and outputs the measured path loss or channel state to the higher layer processing unit 101. In addition, the channel measurement portion 1059 calculates a channel estimation value of the downlink on the basis of the downlink reference signal, and outputs the estimation value to the demultiplexing portion 1055.

The transmission unit 107 generates an uplink reference signal in response to the control signal which is input from the control unit 103, codes and modulates uplink data (transport block) which is input from the higher layer processing unit 101, multiplexes the PUCCH, the PUSCH, and the generated uplink reference signal, and transmits the obtained result to the base station apparatus 3 via the transmit and receive antenna 109.

The coding portion 1071 performs coding such as convolutional coding or block coding on the uplink control information which is input from the higher layer processing unit 101. In addition, the coding portion 1071 performs turbo coding on the basis of information used for scheduling the PUSCH.

The modulation portion 1073 modulates the coded bits which are input from the coding portion 1071 using a modulation method such as BPSK, QPSK, 16 QAM, or 64 QAM, of which a notification is sent with the downlink control information, or through a modulation method which is predefined for each channel. The modulation portion 1073 determines the number of data sequences which are spatially multiplexed on the basis of the information used for scheduling the PUSCH, maps a plurality of uplink data items which are transmitted in the same PUSCH to a plurality of sequences by using multiple input multiple output spatial multiplexing (MIMO SM), and performs precoding on the sequences.

The uplink reference signal generation portion 1079 generates sequences obtained according to a predefined rule (expression) on the basis of a physical cell identity (PCI; referred to as a cell ID or the like) for identifying the base station apparatus 3, a bandwidth in which the uplink reference signal is mapped, cyclic shift of which a notification has been sent in an uplink grant, values of parameters for generation of a DMRS sequence, and the like. In response to the control signal which is input from the control unit 103, the multiplexing portion 1075 arranges modulation symbols of the PUSCH in parallel, and performs discrete Fourier transform (DFT) thereon. In addition, the multiplexing portion 1075 multiplexes signals of the PUCCH and the PUSCH, and the generated uplink reference signal for each transmit antenna port. In other words, the multiplexing portion 1075 maps the signals of the PUCCH and the PUSCH and the generated uplink reference signal in resource elements for each transmit antenna port.

The radio transmission portion 1077 performs inverse fast Fourier transform (IFFT) on the multiplexed signal so as to perform modulation thereon through an SC-FDMA method; adds a guard interval to a SC-FDMA symbol which is SC-FDMA-modulated, so as to generate a digital signal with a base band; converts the digital signal with the base band into an analog signal; generates an in-phase component and an orthogonal component with an intermediate frequency from the analog signal; removes a remaining frequency component for an intermediate frequency band; converts (up-converts) the signal with the intermediate frequency into a signal with a radio frequency; removes a remaining frequency component therefrom; amplifies power of the signal; and outputs the signal to the transmit and receive antenna 109 so that the signal is transmitted.

Figure 25:
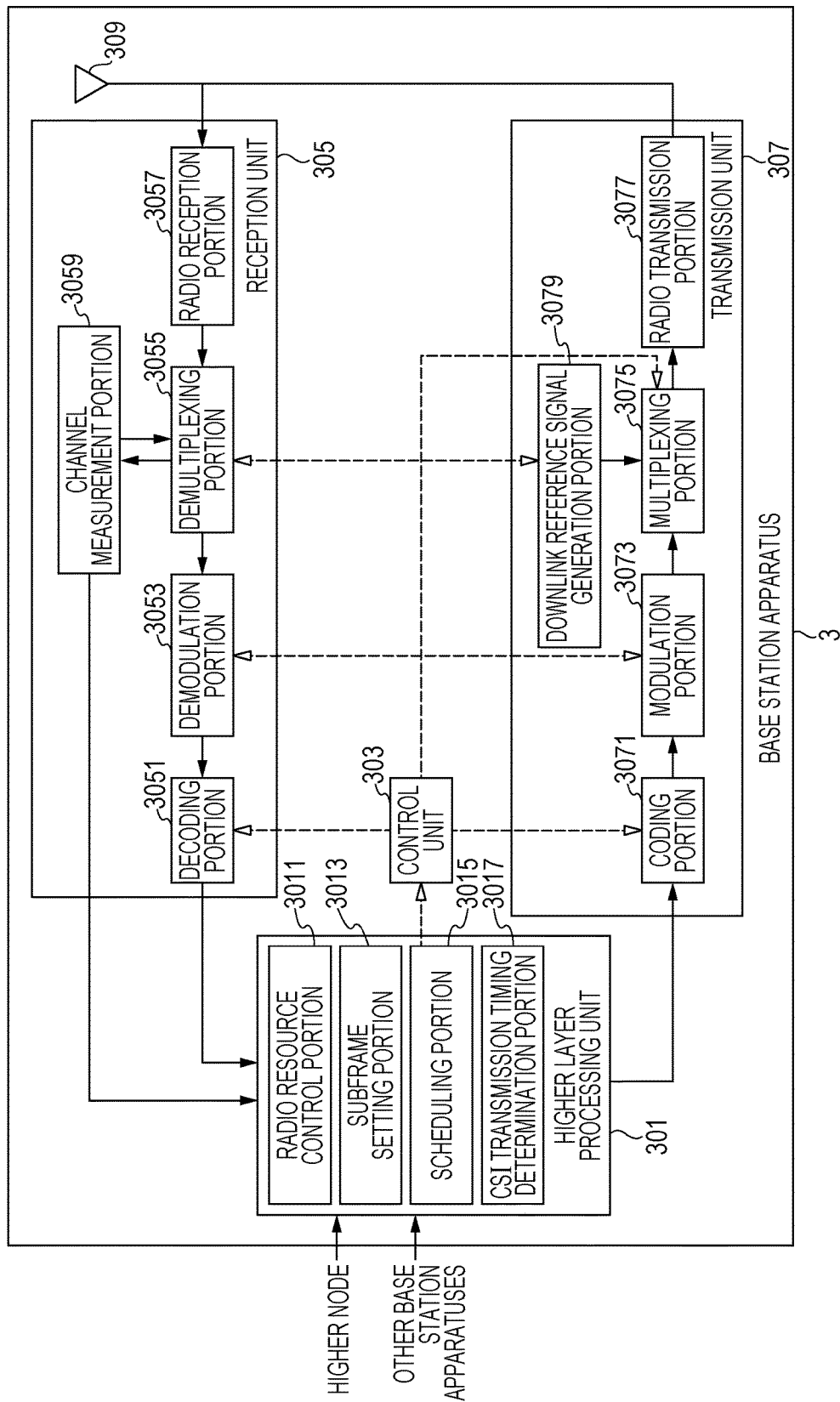
FIG. 25 is a schematic block diagram illustrating a configuration of a base station apparatus 3 of the present embodiment.

FIG. 25 is a schematic block diagram illustrating a configuration of the base station apparatus 3 of the present embodiment. As illustrated in FIG. 25, the base station apparatus 3 includes a higher layer processing unit 301, a control unit 303, a reception unit 305, a transmission unit 307, and a transmit and receive antenna 309. In addition, the higher layer processing unit 301 includes a radio resource control portion 3011, a subframe setting portion 3013, a scheduling portion 3015, and a CSI transmission timing determination portion 3017. Further, the reception unit 305 includes a decoding portion 3051, a demodulation portion 3053, a demultiplexing portion 3055, a radio reception portion 3057, and a channel measurement portion 3059. Furthermore, the transmission unit 307 includes a coding portion 3071, a modulation portion 3073, a multiplexing portion 3075, a radio transmission portion 3077, and a downlink reference signal generation portion 3079.

The higher layer processing unit 301 performs processes on a medium access control (MAC) layer, a packet data convergence protocol (PDCP) layer, a radio link control (RLC) layer, and a radio resource control (RRC) layer. In addition, the higher layer processing unit 301 generates control information for controlling the reception unit 305 and the transmission unit 307 and transmits the control information to the control unit 303.

The radio resource control portion 3011 of the higher layer processing unit 301 generates downlink data (transport block) which will be mapped in the PDSCH of a downlink, system information, an RRC message, a MAC control element (CE), and the like, or acquires the information from a higher node, and outputs the information to the transmission unit 307. In addition, the radio resource control portion 3011 manages various items of configuration information of each of the mobile station apparatuses 1.

The subframe setting portion 3013 of the higher layer processing unit 301 performs, on each of the mobile station apparatuses 1, management of the first uplink reference UL-DL configuration, the first downlink reference UL-DL configuration, the second uplink reference UL-DL configuration, the second downlink reference UL-DL configuration, and the transmission direction UL-DL configuration.

The subframe setting portion 3013 sets, in each of the mobile station apparatuses 1, the first uplink reference UL-DL configuration, the first downlink reference UL-DL configuration, the second uplink reference UL-DL configuration, the second downlink reference UL-DL configuration, and the transmission direction UL-DL configuration.

The subframe setting portion 3013 generates first information indicating the first uplink reference UL-DL configuration, second information indicating the first downlink reference UL-DL configuration, and third information indicating the transmission direction UL-DL configuration. The subframe setting portion 3013 transmits the first information, the second information, and the third information to the mobile station apparatus 1 via the transmission unit 307.

The base station apparatus 3 determines the first uplink reference UL-DL configuration, the first downlink reference UL-DL configuration, the second uplink reference UL-DL configuration, the second downlink reference UL-DL configuration, and/or the transmission direction UL-DL configuration for the mobile station apparatus 1. In addition, the base station apparatus 3 may be given an instruction for the first uplink reference UL-DL configuration, the first downlink reference UL-DL configuration, the second uplink reference UL-DL configuration, the second downlink reference UL-DL configuration, and/or the transmission direction UL-DL configuration, related to the mobile station apparatus 1, from a higher node.

For example, the subframe setting portion 3013 may determine the first uplink reference UL-DL configuration, the first downlink reference UL-DL configuration, the second uplink reference UL-DL configuration, the second downlink reference UL-DL configuration, and/or the transmission direction UL-DL configuration on the basis of an uplink traffic amount and a downlink traffic amount.

The scheduling portion 3015 of the higher layer processing unit 301 determines a frequency and a subframe in which physical channels (the PDSCH and the PUSCH) are assigned, a coding rate of the physical channels (the PDSCH and the PUSCH), a modulation method, transmission power, and the like, on the basis of a channel estimation value, channel quality, or the like which is input from the channel measurement portion 3059. The scheduling portion 3015 determines whether a downlink physical channel and/or a downlink physical signal (are) is scheduled or an uplink physical channel and/or an uplink physical signal (are) is scheduled, in a flexible subframe. The scheduling portion 3015 generates control information (for example, a DCI format) for controlling the reception unit 305 and the transmission unit 307 on the basis of the scheduling result, and outputs the control information to the control unit 303.

The scheduling portion 3015 generates information used for scheduling the physical channels (the PDSCH and the PUSCH) on the basis of the scheduling result. The scheduling portion 3015 determines timings for performing a transmission process and a reception process on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI transmission timing determination portion 3017 specifies (selects, determines) a periodicity and/or a timing offset at which the mobile station apparatus 1 transmits the periodic CSI. The CSI transmission timing determination portion 3017 transmits an index indicating the specified periodicity and/or timing offset to the mobile station apparatus 1 as an RRC parameter via the transmission unit 307.

The CSI transmission timing determination portion 3017 may restrict a subframe in which the mobile station apparatus 1 transmits the periodic CSI on the basis of the first downlink reference UL-DL configuration which is determined by the subframe setting portion 3013. In addition, the CSI transmission timing determination portion 3017 may restrict a periodicity and/or a timing offset in which the mobile station apparatus 1 transmits the periodic CSI on the basis of the first downlink reference UL-DL configuration which is determined by the subframe setting portion 3013.

The control unit 303 generates control signals for controlling the reception unit 305 and the transmission unit 307 on the basis of the control information from the higher layer processing unit 301. The control unit 303 outputs the generated control signals to the reception unit 305 and the transmission unit 307 so as to control the reception unit 305 and the transmission unit 307.

The reception unit 305 demultiplexes, demodulates and decodes a received signal which is received from the mobile station apparatus 1 via the transmit and receive antenna 309, in response to the control signal which is input from the control unit 303, and outputs the decoded information to the higher layer processing unit 301. The radio reception portion 3057 converts (down-converts) an uplink signal which is received via the transmit and receive antenna 309 into an intermediate frequency so as to remove unnecessary frequency components, controls an amplification level so that a signal level is appropriately maintained, orthogonally demodulates the received signal on the basis of an in-phase component and an orthogonal component thereof, and converts the orthogonally demodulated analog signal into a digital signal.

The radio reception portion 3057 removes a portion corresponding to a guard interval (GI) from the converted digital signal. The radio reception portion 3057 performs fast Fourier transform (FFT) on the signal from which the guard interval is removed, so as to extract a signal of the frequency domain which is thus output to the demultiplexing portion 3055.

The demultiplexing portion 1055 demultiplexes the signal which is input from the radio reception portion 3057, into signals such as the PUCCH, the PUSCH, and the uplink reference signal. In addition, this demultiplexing is performed on the basis of radio resource assignment information which is determined in advance by the radio resource control portion 3011 and is included in an uplink grant of which the base station apparatus 3 notifies to each mobile station apparatus 1. Further, the demultiplexing portion 3055 compensates channels such as the PUCCH and the PUSCH on the basis of channel estimation values which are input from the channel measurement portion 3059. Furthermore, the demultiplexing portion 3055 outputs the demultiplexed uplink reference signal to the channel measurement portion 3059.

The demodulation portion 3053 performs inverse discrete Fourier transform (IDFT) on the PUSCH so as to acquire modulation symbols, and performs demodulation of the received signal on each of the modulation symbols of the PUCCH and the PUSCH, by using a modulation method which is predefined, such as binary phase shift keying (BPSK), QPSK, 16 QAM, or 64 QAM, or a modulation method of which the base station apparatus 3 notifies the mobile station apparatus 1 in advance in an uplink grant. The demodulation portion 3053 demultiplexes modulation symbols of a plurality of uplink data items transmitted in the same PUSCH by using the MIMO SM on the basis of the number of spatially multiplexed sequences of which a notification is sent to each mobile station apparatus 1 in advance in the uplink grant and information for giving an instruction for precoding which will be performed on the sequences.

The decoding portion 3051 decodes coded bits of the demodulated PUCCH and PUSCH at a coding rate which is predefined in a predefined coding method or of which the base station apparatus 3 notifies the mobile station apparatus 1 in the uplink grant in advance, and outputs decoded uplink data and uplink control information to the higher layer processing unit 101. In a case where the PUSCH is retransmitted, the decoding portion 3051 performs decoding by using coded bits which are input from the higher layer processing unit 301 and are stored in a HARQ buffer and the demodulated coded bits. The channel measurement portion 3059 measures channel estimation values, quality of the channels, and the like on the basis of the uplink reference signal which is input from the demultiplexing portion 3055, and outputs the measured results to the demultiplexing portion 3055 and the higher layer processing unit 301.

The transmission unit 307 generates a downlink reference signal in response to the control signal which is input from the control unit 303, codes and modulates the HARQ indicator, the downlink control signal, and the downlink data which are input from the higher layer processing unit 301, multiplexes the PHICH, the PDCCH, the EPDCCH, the PDSCH, and the downlink reference signal, and transmits a signal to the mobile station apparatus 1 via the transmit and receive antenna 309.

The coding portion 3071 performs coding on the HARQ indicator, the downlink control information, and the downlink data which are input from the higher layer processing unit 301, by using a predefined coding method such as block coding, convolutional coding, or turbo coding, or by using a coding method determined by the radio resource control portion 3011. The modulation portion 3073 modulates the coded bits which are input from the coding portion 3071 by using a predefined modulation method such as BPSK, QPSK, 16 QAM, or 64 QAM, or by using a modulation method determined by the radio resource control portion 3011.

The downlink reference signal generation portion 3079 generates sequences which are obtained using a predefined rule and are known to the mobile station apparatus 1, as the downlink reference signal, on the basis of a physical cell identity (PCI) or the like for identifying the base station apparatus 3. The multiplexing portion 3075 multiplexes the modulation symbol of each modulated channel and the generated downlink reference signal. In other words, the multiplexing portion 3075 maps the modulation symbol of each modulated channel and the generated downlink reference signal in resource elements.

The radio transmission portion 3077 performs inverse fast Fourier transform (IFFT) on the multiplexed modulation symbol so as to perform modulation thereon through an OFDM method; adds a guard interval to an OFDM symbol which is OFDM-modulated, so as to generate a digital signal with a base band; converts the digital signal with the base band into an analog signal; generates an in-phase component and an orthogonal component with an intermediate frequency from the analog signal; removes a remaining frequency component from an intermediate frequency band; converts (up-converts) the signal with the intermediate frequency into a signal with a radio frequency (RF); removes a remaining frequency component therefrom; amplifies power of the signal; and outputs the signal to the transmit and receive antenna 309 so that the signal is transmitted.

As mentioned above, in the present embodiment, a reporting periodicity and/or a timing offset of the periodic CSI is restricted on the basis of the set first downlink reference UL-DL configuration, and thus it is possible to prevent conflict from occurring when the mobile station apparatus 1 in which the dynamic TDD is configured transmits the periodic CSI at a timing at which the base station apparatus 3 transmits a downlink signal.

In addition, only the periodic CSI has been described in the above method, but the method may be applied to other pieces of information as long as the information can be periodically transmitted. For example, the method may be applied to a scheduling request (SR) indicating a request for a PUSCH resource.

A subframe used to transmit the SR is specified (selected, determined) on the basis of the following Equation 3.

$$(10 \times n_f + \lfloor n_s/2 \rfloor - N_{OFFSET,SR}) \bmod (SR_{PERIODICITY}) = 0 \quad \text{[Math 3]}$$

Here, $n_f$ indicates a system frame number, and $n_s$ indicates a slot number in a system frame. In addition, $N_{OFFSET,SR}$ indicates a transmission timing offset of the SR, and $SR_{PERIODICITY}$ indicates a periodicity of a subframe in which the SR can be transmitted, both of which are respectively set through signaling of a high layer on the basis of a table illustrated in FIG. 26. In FIG. 26, $I_{SR}$ is a parameter of which a notification is sent from a high layer, and the mobile station apparatus 1 having received the notification of the parameter specifies (selects, determines) $SR_{PERIODICITY}$ and $N_{OFFSET,SR}$ by using the table shown in FIG. 26.

Hereinafter, a description will be made of a case where a periodicity of a subframe in which the SR can be transmitted on the basis of the first downlink reference UL-DL configuration. FIG. 27 illustrates configurations of a downlink subframe, a special subframe, and an uplink subframe in the first downlink reference UL-DL configuration, and supported periodicities of a subframe in which the SR can be transmitted in the configuration. In the present embodiment, the mobile station apparatus 1 can report the periodic CSI only in the uplink subframe hatched in FIG. 22. Thus, a periodicity of a subframe in which the SR can be transmitted is restricted as follows on the basis of the first downlink reference UL-DL configuration.

(1) $SR_{PERIODICITY}=1$ can be set only in a case where the first downlink reference UL-DL configurations are 0, 1, 3, 4 and 6, and the SR can be transmitted in a case where a subframe is an uplink subframe indicated by the first downlink reference UL-DL configuration.

(2) $SR_{PERIODICITY}=2$ can be set only in a case where the first downlink reference UL-DL configurations are 0, 3 and 6, and the SR can be transmitted in a case where a subframe for each periodicity is an uplink subframe indicated by the first downlink reference UL-DL configuration. However, in a case where the first downlink reference UL-DL configuration is 3, the reporting periodicity may be set only when the timing offset $N_{OFFSET,SR}$ is 0.

(3) $SR_{PERIODICITY}$=5 can be set only in a case where the first downlink reference UL-DL configurations are 0, 1, 2 and 6. However, in a case where the first downlink reference UL-DL configuration is 6, the reporting periodicity may be set only when the timing offset $N_{OFFSET,SR}$ is 2 or 3.

(4) $SR_{PERIODICITY}$=10, 20, 40, and 80 can be set by all of the first downlink reference UL-DL configurations.

In addition, even a periodicity supported on the basis of the first downlink reference UL-DL configuration may be excluded in a case where a subframe designated by the timing offset $N_{OFFSET,SR}$ is a downlink subframe indicated by the first downlink reference UL-DL configuration at all times.

In the same manner as in the case of the periodic CSI, predetermined error handling may be performed in a case where a periodicity and/or a timing offset of a subframe in which the SR can be transmitted, of which a notification is sent via a high layer are (is) not an applicable value. Further, the predetermined error handling may be performed in the high layer.

In addition, in a case where the second information has been received, the mobile station apparatus 1 restricts a periodicity and/or a timing off of a subframe in which the SR can be transmitted, on the basis of the first downlink reference UL-DL configuration which is set on the basis of the second information. In a case where the second information has not been received, the mobile station apparatus 1 restricts a periodicity and/or a timing offset of a subframe in which the SR can be transmitted, on the basis of the first downlink reference UL-DL configuration which is set on the basis of the first information. This will be described in detail with reference to a flowchart illustrated in FIG. 28. The mobile station apparatus 1 determines whether or not the second information for a primary cell has been received (S1500). If the second information for the primary cell has been received, the mobile station apparatus 1 sets the first downlink reference UL-DL configuration for the primary cell on the basis of the second information for the primary cell (S1501). If the second information for the primary cell has not been received (else/otherwise), the mobile station apparatus 1 sets the first downlink reference UL-DL configuration for the primary cell on the basis of the first information for the primary cell (S1502). The mobile station apparatus 1 restricts a reporting periodicity and/or a timing offset of a subframe in which the SR can be transmitted, on the basis of the first downlink reference UL-DL configuration for the primary cell which is set in S1501 or S1502 (S1503).

However, the method is described on the premise that the mobile station apparatus 1 transmits the SR via the PUCCH only in a primary cell, however, another method is employed in a case where the mobile station apparatus 1 transmits the SR via the PUCCH in a secondary cell. For example, the mobile station apparatus 1 may receive the second information for a secondary cell, set the first downlink reference UL-DL configuration for the secondary cell on the basis of the second information, and restrict a reporting periodicity and/or a timing offset of a subframe in which the SR can be transmitted in the secondary cell on the basis of the first downlink reference UL-DL configuration for the secondary cell. For example, the mobile station apparatus 1 may restrict a reporting periodicity and/or a timing offset of the SR which is transmitted in the primary cell and/or the secondary cell on the basis of the first downlink reference UL-DL configuration for the primary cell and the first downlink reference UL-DL configuration for the secondary cell.

As mentioned above, a periodicity and/or a timing offset of a subframe in which the SR can be transmitted is restricted on the basis of the set first downlink reference UL-DL configuration, and thus it is possible to prevent conflict from occurring when the mobile station apparatus 1 in which the dynamic TDD is configured transmits the SR at a timing at which the base station apparatus 3 transmits a downlink signal.

(i) A mobile station apparatus 1 of the present embodiment performs periodic channel state information reporting to a base station apparatus 3, and the mobile station apparatus 1 includes a reception unit 105 that receives first information, second information, and index information ($I_{CQI/PMI}$) indicating a value ($N_{pd}$) of reporting periodicity of the channel state information, from the base station apparatus 3; and a CSI transmission control portion 1017 that determines the value ($N_{pd}$) of reporting periodicity of the channel state information on the basis of the index information ($I_{CQI/PMI}$), in which the applicable value ($N_{pd}$) is based on a certain UL-DL configuration, in which, in a case where the second information is not configured, the certain UL-DL configuration is a UL-DL configuration indicated by the first information, and in which, in a case where the second information is configured, the certain UL-DL configuration is a UL-DL configuration indicated by the second information.

(ii) The reception unit 105 of the mobile station apparatus 1 receives third information, and a UL-DL configuration indicated by the third information is used for the channel state information measurement.

(iii) In the mobile station apparatus 1 of the present embodiment, each of the first information and the second information corresponds to a primary cell.

(iv) In the mobile station apparatus 1 of the present embodiment, in a case where the second information is configured, a scheduling timing of a physical uplink shared channel is set according to a UL-DL configuration indicated by the first information, and a downlink HARQ timing is set according to a UL-DL configuration indicated by the second information.

(v) In the mobile station apparatus 1 of the present embodiment, in a case where the second information is configured, uplink scheduling timing and downlink HARQ timing are set according to a UL-DL configuration indicated by the first information.

(vi) In the mobile station apparatus 1 of the present embodiment, the index information ($I_{CQI/PMI}$) indicates an offset value ($N_{OFFSET,CQI}$) for the channel state information reporting.

(vii) A base station apparatus 3 receives periodic channel state information reporting from a mobile station apparatus 1, and the base station apparatus 3 includes a CSI transmission timing determination portion 3017 that generates index information ($I_{CQI/PMI}$) indicating a value ($N_{pd}$) for reporting periodicity of the channel state information; and a transmission unit 307 that transmits first information, second information, and the index information ($I_{CQI/PMI}$) to the mobile station apparatus 1, in which the applicable value ($N_{pd}$) is based on a certain UL-DL configuration, in which, in a case where the second information is configured, scheduling timing of a physical uplink shared channel is set according to a UL-DL configuration indicated by the first information, downlink HARQ timing is configured according to a UL-DL configuration indicated by the second information, and the certain UL-DL configuration which is the UL-DL configuration indicated by the second information.

(viii) In base station apparatus 3 of the present embodiment, in a case where the second information is configured, uplink scheduling timing and downlink HARQ timing are set according to a UL-DL configuration indicated by the first information, and the certain UL-DL configuration is the UL-DL configuration is indicated by the first information.

(ix) The transmission unit 307 of the base station apparatus transmits third information, and a UL-DL configuration indicated by the third information is used for the channel state information measurement.

(x) In the base station apparatus 3 of the present embodiment, each of the first information and the second information corresponds to a primary cell.

(xi) The index information ($I_{CQI/PMI}$) generated by the CSI transmission timing determination portion 3017 of the base station apparatus 3 of the present embodiment indicates an offset value ($N_{OFFSET,CQI}$) for the channel state information reporting.

In addition, in the above-described embodiment, the mobile station apparatus 1 may include a subframe setting portion 1013 that specifies a first uplink reference UL-DL configuration and a first downlink reference UL-DL configuration on the basis of information of which a notification is sent from the base station apparatus 3; and a CSI transmission control portion 1017 that specifies a value ($N_{pd}$) for reporting periodicity of a subframe for reporting the channel state information to the base station apparatus 3 on the basis of the index information ($I_{CQI/PMI}$) indicating the value ($N_{pd}$) for reporting periodicity of the channel state information, of which a notification is sent from the base station apparatus 3, and information indicating the value ($N_{pd}$) for reporting periodicity of the channel state information, supported by the first downlink reference UL-DL configuration.

Further, in the above-described embodiment, the mobile station apparatus 1 may include a subframe setting portion 1013 that specifies a first uplink reference UL-DL configuration on the basis of first information of which a notification is sent from the base station apparatus 3 and specifies a first downlink reference UL-DL configuration on the basis of second information of which a notification is sent from the base station apparatus 3 or the first information; and a CSI transmission control portion 1017 that specifies a supported value ($N_{pd}$) for reporting periodicity of the channel state information on the basis of the first information in a case where the first downlink reference UL-DL configuration is specified on the basis of the first information, specifies a supported value ($N_{pd}$) for reporting periodicity of the channel state information on the basis of the second information in a case where the first downlink reference UL-DL configuration is specified on the basis of the second information, and specifies a value ($N_{pd}$) for reporting periodicity of a subframe for reporting the channel state information to the base station apparatus 3 on the basis of index information ($I_{CQI/PMI}$) indicating the value ($N_{pd}$) for reporting periodicity of the channel state information, of which a notification is sent from the base station apparatus 3, and information indicating the supported value ($N_{pd}$) for reporting periodicity of the channel state information.

In addition, in the above-described embodiment, the mobile station apparatus 1 and the base station apparatus 3 specify the first downlink reference UL-DL configuration on the basis of the first information in a case where the first downlink reference UL-DL configuration is not specified on the basis of the second information, but may specify a UL-DL configuration of a predetermined serving cell on the basis of the first information. As a value ($N_{pd}$) for reporting periodicity of the channel state information, an applicable value may be defined on the basis of the UL-DL configuration of the predetermined serving cell. Here, the predetermined serving cell may be a primary cell, and may be a serving cell corresponding to the periodic channel state information. In other words, the first downlink reference UL-DL configuration specified on the basis of the first information may also be referred to as a UL-DL configuration of a serving cell.

A program which runs in the base station apparatus 3 and the mobile station apparatus 1 according to the present invention is a program (which causes a computer to function) which controls a central processing unit (CPU) and the like so as to realize the functions of the embodiments according to the present invention. In addition, the information treated in these devices is temporarily accumulated in a random access memory (RAM) during the processing thereof, is then stored in various ROMs such as a flash read only memory (ROM) or hard disk drives (HDDs), and is read by the CPU as necessary so as to be corrected and be written.

In addition, part of the mobile station apparatus 1 and the base station apparatus 3 in the above-described embodiments may be realized by a computer. In this case, a program for realizing the control function is recorded on a computer readable recording medium, and the control function may be realized by a computer system reading and executing the program recorded on the recording medium.

In addition, the "computer system" mentioned here is a computer system which is built into the mobile station apparatus 1 or the base station apparatus 3, and includes hardware such as an OS or peripheral devices. Further, the "computer readable recording medium" refers to a portable medium such as a flexible disk, a magneto-optical disc, a ROM, or a CD-ROM, and a storage device such as a hard disk built into the computer system.

Furthermore, the "computer readable recording medium" may also include one which dynamically holds a program for a short period of time, such as a communication line in a case where the program is transmitted via a network such as the Internet or a communication line such as a telephone line, and one which holds the program for a specific time, such as a nonvolatile memory of the computer system which becomes a server or a client in this case. Moreover, the program may be one which realizes some of the above-described functions, and may be one which realizes the above-described functions in combination with a program which has already been recorded in the computer system.

In addition, the base station apparatus 3 of the above-described embodiments may be realized as an aggregate (device groups) constituted by a plurality of devices. Each of the devices constituting the device group may include each function, or some or all of the functional blocks of the base station apparatus 3 according to the embodiments. The device group may have each general function or each general functional block of the base station apparatus 3. Further, the mobile station apparatus 1 according to the above-described embodiments may communicate with the base station apparatus 3 as an aggregate.

In addition, the base station apparatus 3 in the above-described embodiments may be an evolved universal terrestrial radio access network (EUTRAN). Further, the base station apparatus 3 in the above-described embodiments may have some or all of the functions of the higher node of eNodeB.

Further, part or the whole of the mobile station apparatus 1 and the base station apparatus 3 in the above-described embodiments may be typically implemented by an LSI which is an integrated circuit, and may be realized by a chip set. The respective functional blocks of the mobile station apparatus 1 and the base station apparatus 3 may be separately formed of a chip, and some or all of the blocks may be integrally formed as a chip. Further, a technique for an integrated circuit is not limited to an LSI, and may be realized by a dedicated circuit or a general purpose processor. Furthermore, in a case where a technique for an integrated circuit replacing the LSI appears with the advance of a semiconductor technique, an integrated circuit based on the technique may be used.

In addition, in the above-described embodiments, a mobile station apparatus has been described as an example of a terminal apparatus or a communication apparatus, but the present invention is not limited thereto, and is applicable to terminal apparatuses or communication apparatuses, such as non-movable or stationary electronic apparatuses installed indoors or outdoors, for example, AV apparatuses, kitchen apparatuses, cleaning and washing apparatuses, air-conditioning apparatuses, vending machines, and other pieces of household equipment.

As mentioned above, although the embodiments of the present invention have been described in detail with reference to the drawings, a specific configuration is not limited to the embodiments, and design modifications and the like may occur within the scope without departing from the spirit of the invention. In addition, various alterations may occur in the claims of the present invention, and embodiments obtained by appropriately combining technical means which are respectively disclosed in different embodiments are also included in the technical scope of the present invention. Further, configurations in which the elements which are disclosed in the above-described respective embodiments and achieve the same effect are replaced with each other are also included in the technical scope of the present invention.

DESCRIPTION OF REFERENCE NUMERALS 1 (1A, 1B, 1C) MOBILE STATION APPARATUS
3 BASE STATION APPARATUS
101 HIGHER LAYER PROCESSING UNIT
103 CONTROL UNIT
105 RECEPTION UNIT
107 TRANSMISSION UNIT
301 HIGHER LAYER PROCESSING UNIT
303 CONTROL UNIT
305 RECEPTION UNIT
307 TRANSMISSION UNIT
1011 RADIO RESOURCE CONTROL PORTION
1013 SUBFRAME SETTING PORTION
1015 SCHEDULING INFORMATION ANALYSIS PORTION
1017 CSI transmission control portion
1051 DECODING PORTION
1053 DEMODULATION PORTION
1055 DEMULTIPLEXING PORTION
1057 RADIO RECEPTION PORTION
1059 CHANNEL MEASUREMENT PORTION
1071 CODING PORTION
1073 MODULATION PORTION
1075 MULTIPLEXING PORTION
1077 RADIO TRANSMISSION PORTION
1079 UPLINK REFERENCE SIGNAL GENERATION PORTION
3011 RADIO RESOURCE CONTROL PORTION
3013 SUBFRAME SETTING PORTION
3015 SCHEDULING PORTION
3017 CSI TRANSMISSION TIMING DETERMINATION PORTION
3051 DECODING PORTION
3053 DEMODULATION PORTION
3055 DEMULTIPLEXING PORTION
3057 RADIO RECEPTION PORTION
3059 CHANNEL MEASUREMENT PORTION
3071 CODING PORTION
3073 MODULATION PORTION
3075 MULTIPLEXING PORTION
3077 RADIO TRANSMISSION PORTION
3079 DOWNLINK REFERENCE SIGNAL GENERATION PORTION

The invention claimed is:

1. A terminal apparatus comprising:
a receiver configured to and/or programmed to receive, from a base station apparatus, first information, second information, and index information indicating a periodicity value for channel state information reporting; and
a transmission control circuit configured to and/or programmed to perform periodic channel state information reporting to the base station apparatus, wherein
applicable values for the periodicity value are depending on a UL-DL configuration,
in a case where the second information is configured, the UL-DL configuration is a first UL-DL configuration which is indicated by the second information,
in a case where the second information is not configured, the UL-DL configuration is a second UL-DL configuration which is indicated by the first information, and
in a case where the second information is configured, a scheduling timing of a physical uplink shared channel is set according to the second UL-DL configuration, and a downlink HARQ timing is set according to the first UL-DL configuration.

2. The terminal apparatus according to claim 1, wherein
a first periodicity value is included in the applicable values in a case that the UL-DL configuration belongs to {0, 1, 3, 4, 6},
a second periodicity value different from the first periodicity value is included in the applicable values in a case that the UL-DL configuration belongs to {0, 1, 2, 6}, and
third periodicity values different from the first periodicity value and the second periodicity value are included in the applicable values for any of the UL-DL configuration.

3. The terminal apparatus according to claim 1, wherein the receiver is configured to and/or programmed to receive third information, and
a third UL-DL configuration indicated by the third information is used for channel state information measurement.

4. The terminal apparatus according to claim 1, wherein each of the first information and the second information corresponds to a primary cell.

5. The terminal apparatus according to claim 1, wherein in a case where the second information is not configured, an uplink scheduling timing and a downlink HARQ timing are set according to the second UL-DL configuration.

6. The terminal apparatus according to claim 1, wherein the index information indicates an offset value for the channel state information reporting.

* * * * *